April 20, 1943.   P. L. THURSTON ET AL   2,316,822
PROCESS AND APPARATUS FOR PRODUCING KNITTED FABRIC, HOSIERY
Filed Jan. 14, 1941   18 Sheets-Sheet 2
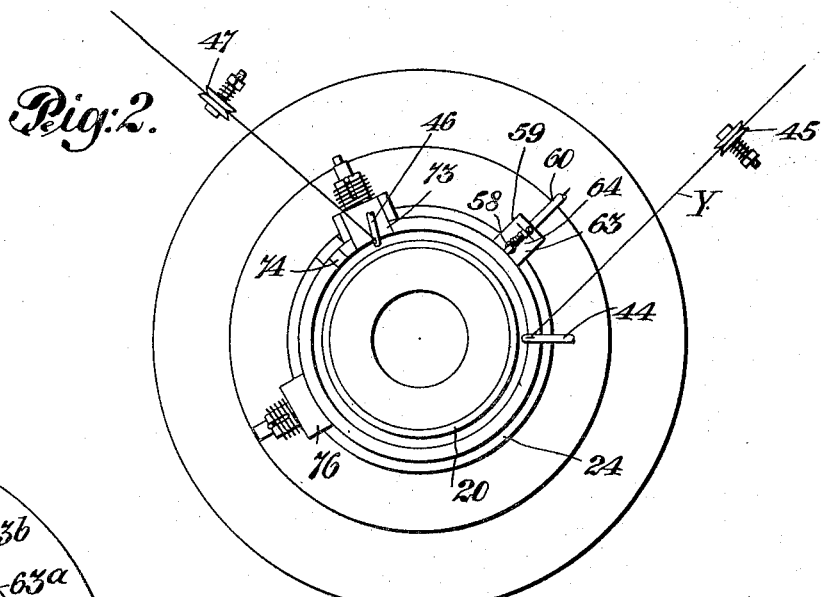
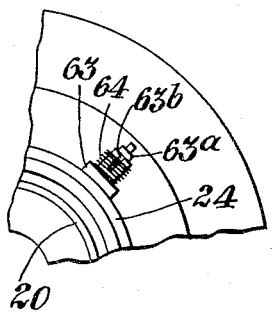
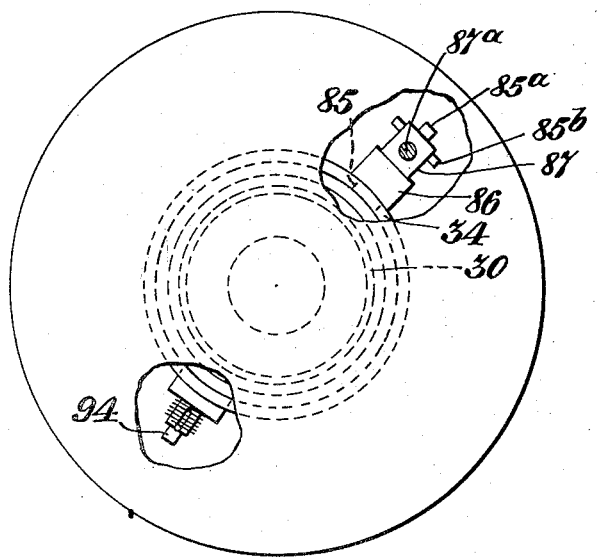
INVENTORS
Paul L. Thurston
David Nagley
BY
Louis ...
ATTORNEY April 20, 1943. P. L. THURSTON ET AL 2,316,822
PROCESS AND APPARATUS FOR PRODUCING KNITTED FABRIC, HOSIERY
Filed Jan. 14, 1941 18 Sheets-Sheet 3

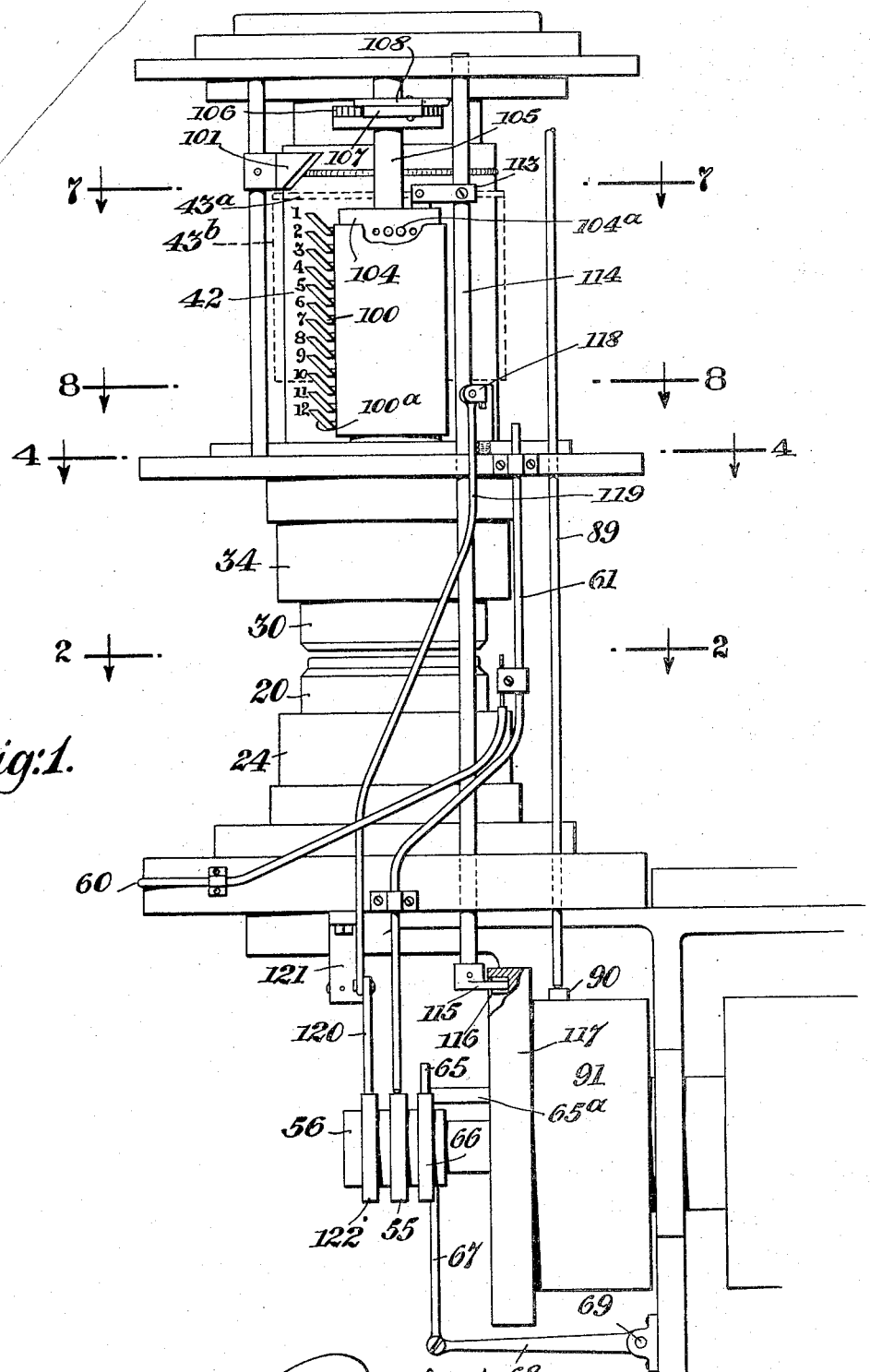

INVENTORS
Paul L. Thurston and
David Negley
BY Louis Prevost Whitaker
ATTORNEY

April 20, 1943.   P. L. THURSTON ET AL   2,316,822
PROCESS AND APPARATUS FOR PRODUCING KNITTED FABRIC, HOSIERY
Filed Jan. 14, 1941   18 Sheets-Sheet 4
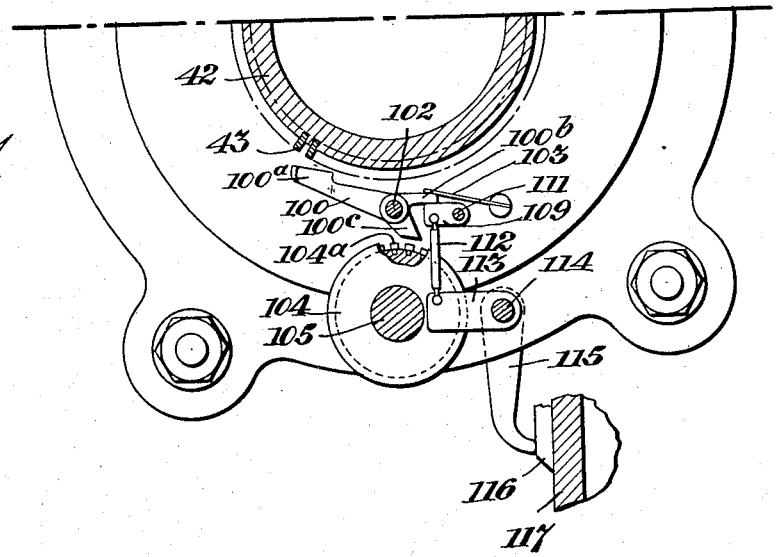
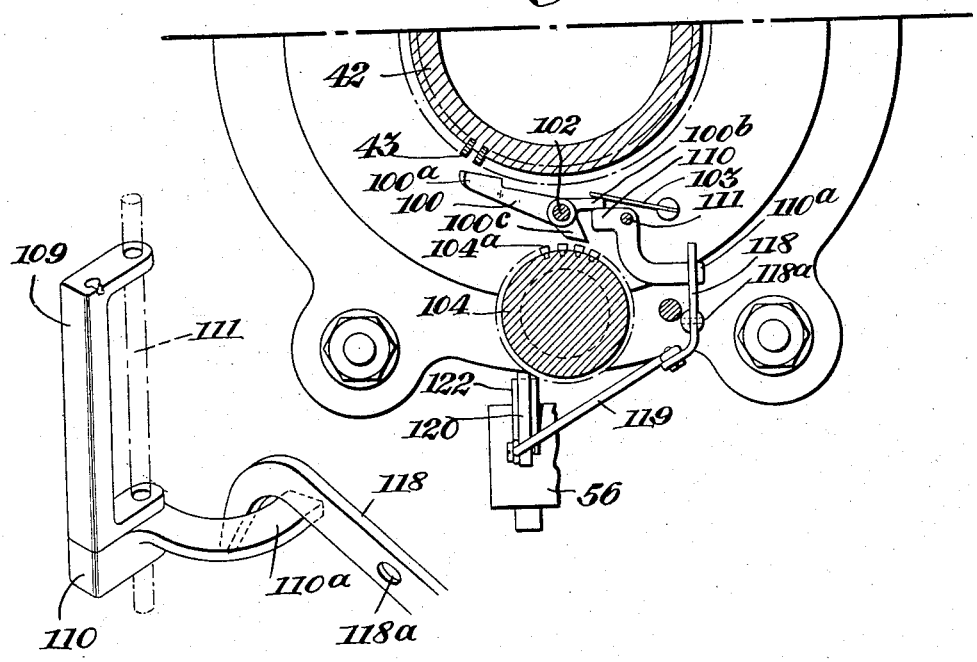

April 20, 1943.  P. L. THURSTON ET AL  2,316,822
PROCESS AND APPARATUS FOR PRODUCING KNITTED FABRIC, HOSIERY
Filed Jan. 14, 1941  18 Sheets-Sheet 7

Fig:12.

April 20, 1943.    P. L. THURSTON ET AL    2,316,822
PROCESS AND APPARATUS FOR PRODUCING KNITTED FABRIC, HOSIERY
Filed Jan. 14, 1941    18 Sheets-Sheet 10

INVENTORS
Paul L. Thurston
David Negley
BY
Louis Prescott Whitaker
ATTORNEY

April 20, 1943. P. L. THURSTON ET AL 2,316,822
PROCESS AND APPARATUS FOR PRODUCING KNITTED FABRIC, HOSIERY
Filed Jan. 14, 1941 18 Sheets-Sheet 12

INVENTORS
Paul L. Thurston
David Negley
BY Louis Prevost Whitaker
ATTORNEY

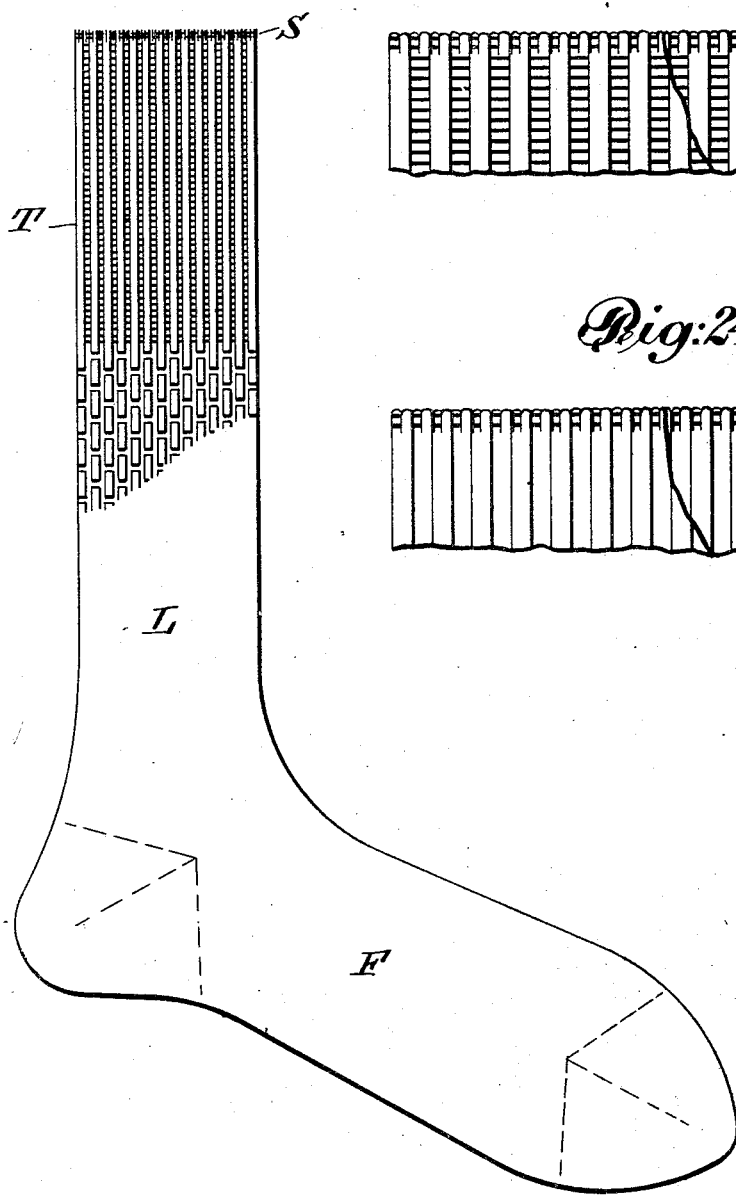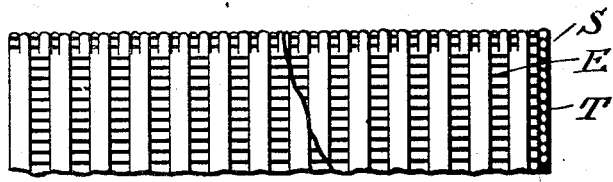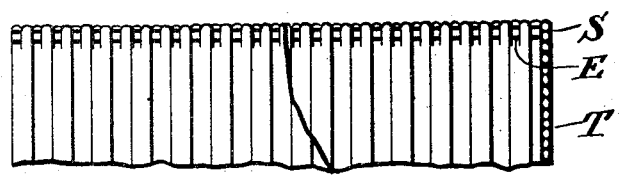

April 20, 1943.  P. L. THURSTON ET AL  2,316,822
PROCESS AND APPARATUS FOR PRODUCING KNITTED FABRIC, HOSIERY
Filed Jan. 14, 1941  18 Sheets-Sheet 15

April 20, 1943.    P. L. THURSTON ET AL    2,316,822
PROCESS AND APPARATUS FOR PRODUCING KNITTED FABRIC, HOSIERY
Filed Jan. 14, 1941    18 Sheets—Sheet 16
Fig. 28.
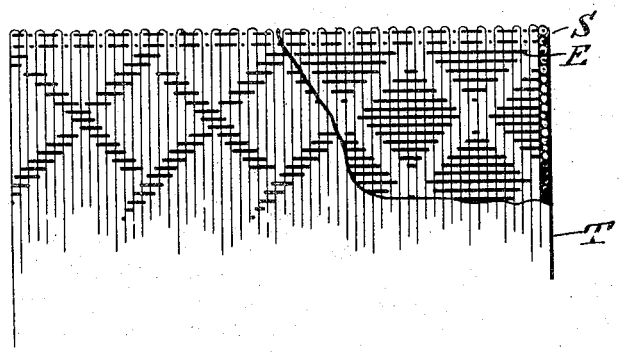
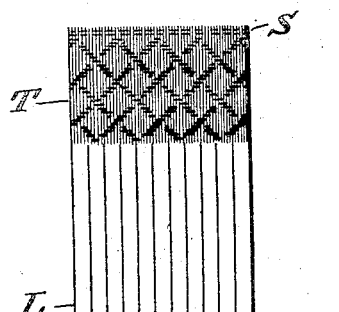
Fig. 27.
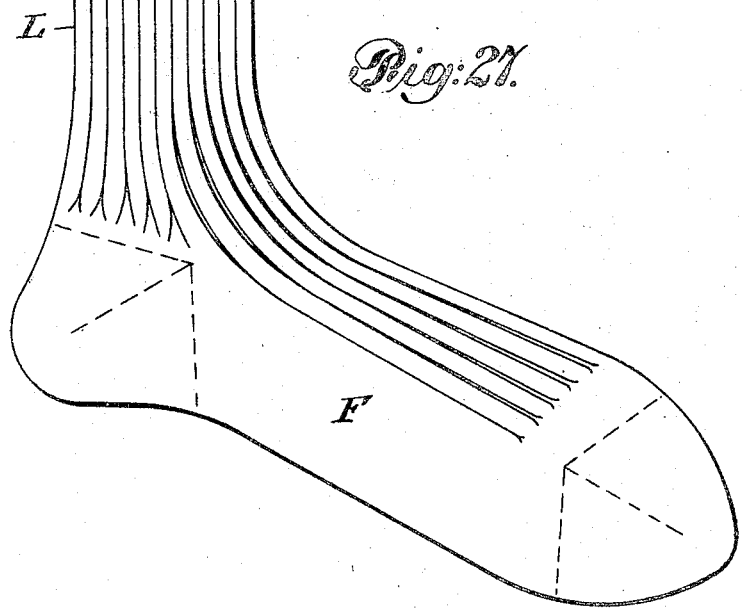
INVENTORS
ATTORNEY April 20, 1943.  P. L. THURSTON ET AL  2,316,822
PROCESS AND APPARATUS FOR PRODUCING KNITTED FABRIC, HOSIERY
Filed Jan. 14, 1941  18 Sheets-Sheet 17
Fig:29.
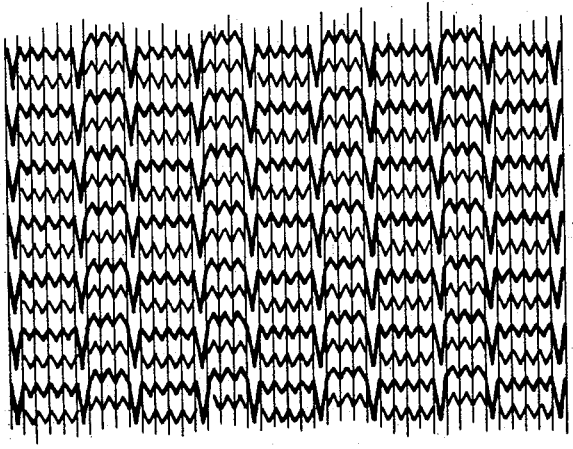
Fig:30.
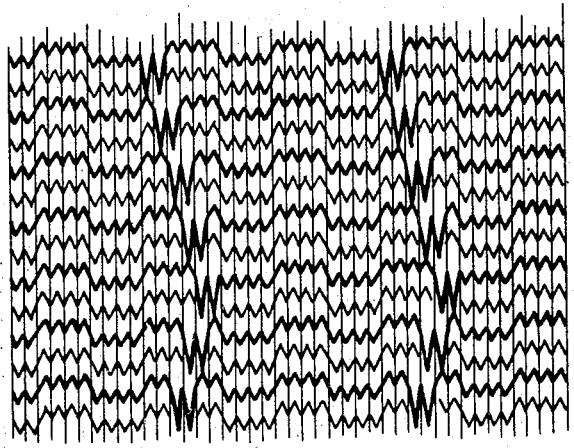

Patented Apr. 20, 1943

2,316,822

UNITED STATES PATENT OFFICE 2,316,822

PROCESS AND APPARATUS FOR PRODUCING KNITTED FABRIC, HOSIERY

Paul L. Thurston and David Nagley, Martinsburg, W. Va., assignors to Interwoven Stocking Company, New Brunswick, N. J., a corporation of New Jersey Application January 14, 1941, Serial No. 374,334

33 Claims. (Cl. 66—14)

Our invention consists in the novel features hereinafter described, reference being had to the accompanying drawings which illustrate embodiments of the same selected by us for the purpose of illustration, and the said invention is fully disclosed in the following description and claims.

Our invention relates to the production of multi-feed fabric on circular knitting machines having coaxial, superposed needle cylinders. In producing such fabric a plurality of separate threads are fed to the needles of the machine and incorporated in the fabric either by knitting all of them or by knitting one and incorporating the other or others in an un-knitted manner so as to be united to the fabric by portions of the knitted thread. While the separate threads used may, if desired, all be alike, they are preferably of different characteristics. For example, one may be a relatively inelastic fabric thread, while the other is an elastic thread. Alternatively, the threads may be of different color or of different material, so as to differ from one another in appearance.

In incorporating elastic thread in knitted fabrics, the inelastic or fabric thread may be fed to all of the needles, while the elastic thread is preferably fed to selected needles only. In many instances it is desirable to have different needle selections in incorporating elastic thread in different parts of an article. For example, in producing self-supporting socks, it is preferable to feed the elastic thread so as to become interlaced in front of alternate needles and behind intervening needles to produce an anti-ravel structure, and thereafter unite the elastic thread to the fabric at more widely spaced points, for example, at every fourth wale in the balance of the self-supporting top portion of the sock. To obtain the required needle selections, it has been proposed to provide special selecting cams cooperating with butts of different lengths provided on the sliders which actuate the needles. As different butt lengths are required in the normal operation of an opposed cylinder machine, the number of additional selections possible is strictly limited. The operation of the machine is further complicated by the fact that successive rounds of elastic thread are preferably spaced by one or more courses of fabric thread without elastic, thereby necessitating the movement of the selecting cams into and out of operative position. It has been found that to avoid breakage of the slider butts by the cams, it is necessary to leave a gap in the circular series of selecting butts in order that the cams may be moved into operative position when the gap is opposite the cam. This gap interferes with the production of an anti-ravel edge, since the corresponding gap in the anti-ravel structure permits the fabric to ravel and in the balance of the fabric the gap results in the production of an undesirably long float of elastic thread at the point where the gap occurs.

It is an object of the present invention to overcome the difficulties encountered in the prior art. Instead of feeding the elastic thread to selected needles in the lower cylinder, it is fed to all of the needles in the upper cylinder, desired ones of the needles being transferred to the upper cylinder to receive the elastic thread. For example, in forming an anti-ravel edge where a 1 x 1 needle selection is desired, every alternate needle is transferred to the upper cylinder where it will receive the elastic thread, while the intervening needles are in the lower cylinder where they will not receive the elastic. As the elastic thread will extend in a straight line from one upper cylinder needle to the next, it will be floated behind the lower cylinder needles when the latter are raised to take the fabric thread, and will thereby be interlaced. Where the elastic thread is to be united to the fabric at more widely spaced points, for example, at every fourth wale, correspondingly spaced needles are transferred to the upper cylinder to take the elastic thread while the remaining needles are in the lower cylinder. The desired selection is obtained merely by transferring the selected needles to the upper cylinder. During the knitting of intervening courses which are not to contain elastic thread, all of the needles are transferred to the lower cylinder where they will receive the fabric thread only, and will not receive the elastic. It is hence unnecessary to withdraw the elastic feed finger or any selecting cam as the incorporation of elastic thread in the fabric is automatically interrupted when the needles are transferred to the lower cylinder. This method of operation produces a novel fabric structure in which there are spaced courses of rib knitting, i. e., courses composed of inwardly facing stitches and outwardly facing stitches alternately disposed singly or in groups around the fabric, the rib knit courses being separated by intervening courses of plain knitting composed of outwardly facing stitches only and the elastic thread being incorporated in the fabric at the rib knit courses.

In incorporating elastic thread in knitted fabric, difficulty has been heretofore encountered in properly regulating the amount of elastic thread introduced into each course. If too much elastic thread is introduced, it puckers up when the fabric contracts upon coming off of the machine, and gives an untidy appearance, while if not enough elastic thread is introduced, it restricts the stretching of the fabric and may be broken when the fabric is distended. Because of the extreme liveliness of elastic thread, it is difficult to control the amount fed to the needles to introduce the same amount of elastic thread into each of the elastic containing courses. In accordance with the present invention, this difficulty is overcome by causing the upper cylinder needles which take the elastic thread to form loops thereof to draw a measured amount of said elastic thread from the thread feed.

To transfer selected needles from one cylinder to the other, the knitting machine is provided with selectors associated with the needles and having selector butts disposed at different levels. A plurality of selector levers arranged at corresponding levels are movable into operative position to act on the selector butts of the selectors to effect transfer of the associated needles from one cylinder to the other. A novel feature of the present invention is the provision of means for independently controlling separate sets of selector levers to maintain one set of levers inoperative while levers of another set are moved into and out of operative position through successive cycles of operation. This makes it possible to use one set composed of one or more selector levers to transfer selected needles from one cylinder to the other in making one section of fabric and thereafter maintain the first set of selector levers inoperative while the levers of another set are moved into and out of operative position to effect the desired needle transfers in making another section of fabric. There can thus be produced successive sections of fabric of different structure, each of which requires the transfer of needles from one cylinder to another in a predetermined cycle, for example, in producing an article of hosiery, one set of selector levers can be used to transfer needles from one cylinder to the other in forming an antiravel edge and incorporating elastic thread in the top portion of the article while another set of selector levers can be used to transfer needles to produce a repeating pattern in the leg portion of the article. Since the first set of levers is held out of operation during the operation of the second set, the cycle of operation for producing the pattern in the leg portion can be repeated any desired number of times without repeating the cycle of operation by which the elastic thread was incorporated in the top portion.

Instead of using fabric thread and elastic thread merely to produce an elastic fabric, threads of different color or appearance may be used to obtain novel design effects. In producing design fabrics on an opposed cylinder machine in accordance with the prior art various difficulties and objections were encountered. Various methods of obtaining designs in knitted fabrics are reverse plating, embroidery wrap and multiple feed. The designs obtainable by using a multiple feed are rather limited as the use of different colored threads at the respective feeds produces only single course horizontal stripes which, at a short distance from the fabric blend together to give the appearance of a mixed color. Embroidery wrap is extremely difficult with a two cylinder machine owing to the position of one cylinder above the other with only a narrow space between the upper and lower cylinder needles.

Reverse plating has been used to a considerable extent, but is not entirely satisfactory as there are too many seconds owing to the failure of the yarns to reverse properly. Moreover, reverse plating will not produce sharply contrasting solid color patterns, owing to the fact that the suppressed yarn shows through the face yarn. The present invention overcomes these difficulties and produces new fabric structures providing attractive solid color designs not heretofore obtainable. In accordance with the invention certain needles are positioned in the upper cylinder with the remaining needles in the lower cylinder, and one thread is fed to needles in both cylinders, while a second thread is fed so as to be received by the upper cylinder needles and miss at least certain of the lower cylinder needles so that the latter will not take the second thread. Thus, certain needles of the machine take both threads one after the other to produce a portion in which courses of one thread alternate with courses of the other, giving a single course horizontal stripe effect, while other needles take one thread only and produce a portion in which successive courses are of the same thread, the second thread being floated behind such portions. Where threads of different color are used, the latter needles will produce a solid color pattern contrasting sharply with the portions of the fabric in which stitches of both threads appear. The stitches in the solid color portions of the fabric are twice the length of the other stitches, giving a further distinction in appearance. Moreover, the stitches of the solid color portion face outwardly, and by forming the surrounding portion of the fabric of inwardly facing stitches, there is obtained an embossed effect in which the solid color design stands out in relief from the mixed color background.

The second thread may be knit on the upper cylinder needles only, or they may be knit on the upper cylinder needles and certain of the lower cylinder needles being floated across selected ones of the needles in the lower cylinder. The upper and lower cylinder needles may be retained in their respective cylinders throughout the knitting of a section of fabric, thus producing a rib knit fabric in which each wale is formed of the same type of stitches throughout, certain wales being formed of inwardly facing stitches with stitches of one thread alternating with those of another, and other wales being formed of outwardly facing stitches of approximately twice the length of said inwardly facing stitches and all formed of the same thread with or without additional wales of outwardly facing stitches formed alternately of different threads. Alternatively, selected needles may be transferred back and forth from one cylinder to the other during the knitting of the fabric to produce what is known as Links-Links fabric in which individual wales are formed in part of inwardly facing stitches and in part of outwardly facing stitches. With this type of fabric, selected needles are so operated that when in the upper cylinder they knit inwardly facing stitches of both threads in succession, and when in the lower cylinder, they knit outwardly facing stitches of one thread only. A solid color design of any desired shape can be produced by transferring selected needles from one cylinder to the other in predetermined sequence.

Instead of being different colors, the threads may differ in other respects such as size, material, lustre, etc. Alternatively, the threads may be alike, the structure of fabric being depended upon to produce the design. Still other effects can be obtained by using a fabric thread of one color and an elastic thread of another color, the elastic thread serving both to increase the elasticity of the fabric and to produce a design. The elastic thread may, if desired, be incorporated in the fabric in an unknitted manner. While for the sake of simplicity the invention is described in conjunction with a two feed machine, it will be understood that additional feeds may be used. The individual control of separate sets of selector levers acting on the selectors associated with the needles makes possible the production of still other combinations of knitted structure not hitherto obtainable. For example, in knitting socks, one set of selectors may be used in making a selvage with 1 x 1 needle selection, and a rib knit top portion with a different needle selection, for example 1 x 2 or 2 x 2, and another set of selector levers may be used to transfer needles from one cylinder to another in predetermined sequence to produce a leg portion of Links-Links fabric with repeating design, but without repeating the needle selections used in making the top portion of the sock. Still other possible ways of utilizing the invention will become apparent from the following description of the embodiments shown by way of example in the accompanying drawings, in which Fig. 1 is a front elevation of a portion of a knitting machine in accordance with the invention, certain details being omitted for the sake of clearness.

Fig. 2 is a schematic plan view taken on the line 2—2 in Fig. 1 and showing the location of certain of the cams of the lower cylinder cam block in relation to the thread feeding station.

Fig. 3 is a fragmentary plan view taken on the line 2—2 of Fig. 1 and showing the location of the further cam in the lower cylinder cam block.

Fig. 4 is a schematic plan view taken on the line 4—4 of Fig. 1 and showing the location of certain cams in the upper cylinder cam block.

Fig. 7 and Fig. 8 are horizontal sectional views taken on the line 7—7 and 8—8 in Fig. 1, showing the operation and control of the selector levers.

Fig. 9 is a detail view of a portion of the mechanism shown in Fig. 8.

Fig. 22 is a side view of another sock embodying the invention.

Fig. 23 is an enlarged diagrammatic view of the top portion of the sock of Fig. 22 with a portion broken away to show the inner face of the fabric.

Fig. 24 is a view similar to Fig. 23 showing a modification.

Fig. 27 is a side view of a further sock embodying the invention.

Fig. 28 is an enlarged diagrammatic view of the top portion of the sock of Fig. 27 with a portion broken away to show the inner face of the fabric.

Fig. 29 shows diagrammatically another form of fabric in accordance with the invention.

Fig. 30 shows a further form of fabric.

Figure 10:
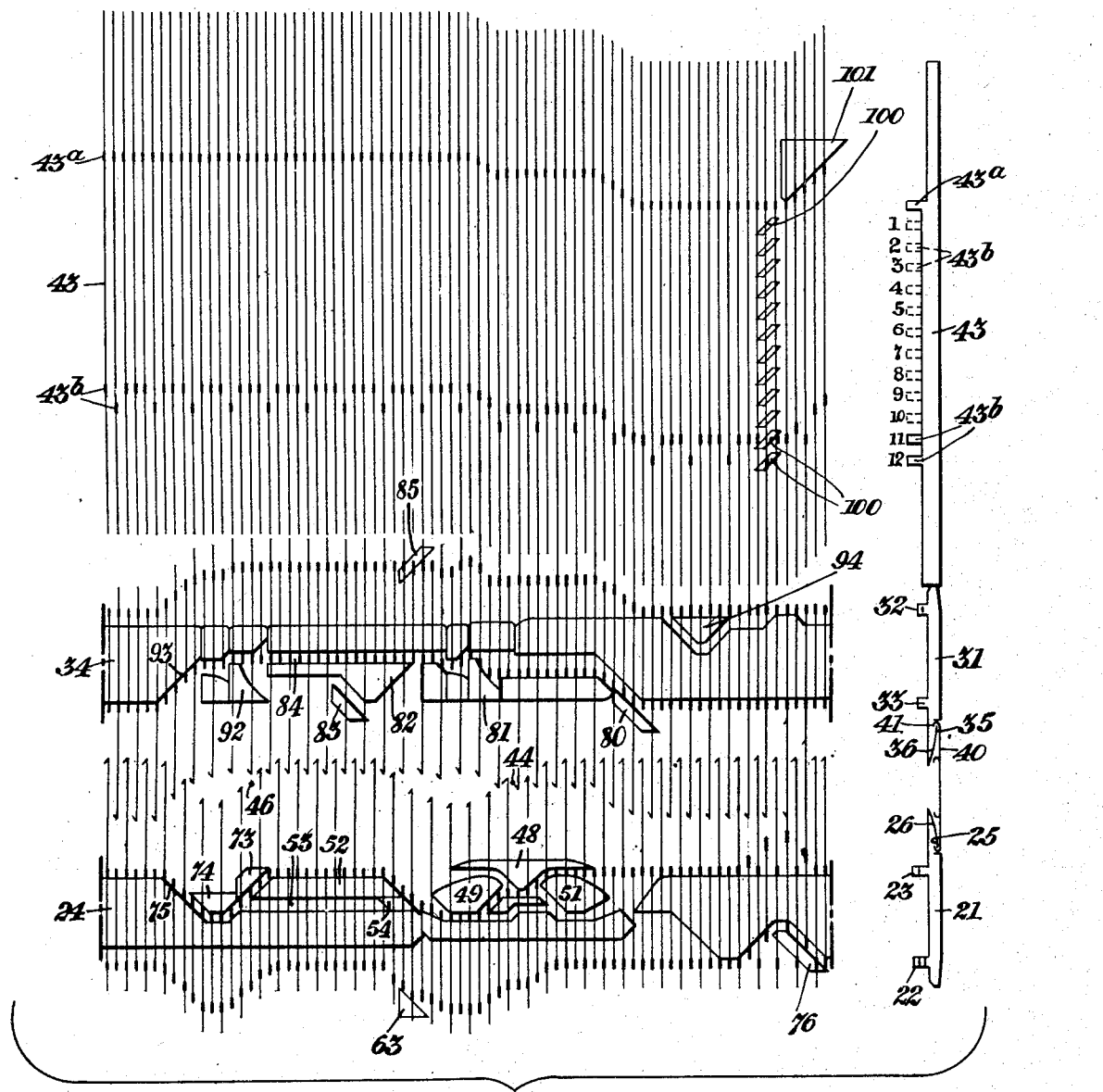
Fig. 10 is an inside view of the cam blocks spread out in a plane, showing the positions of the needles and needle operating sliders and selectors during the operation of incorporating a draw thread in the fabric shown in Fig. 20, and including at the right hand end of Fig. 10 a diagrammatic side view of the needles, sliders and selectors.

In Figs. 1 to 17 of the drawings, there is shown so much of a knitting machine as is necessary to illustrate the present invention. With reference particularly to Figs. 1 and 10, the numeral 20 represents the lower knitting cylinder provided with vertically movable sliders 21, located in the grooves thereof, and having transfer butts 22 and knitting butts 23 for engaging suitable cams on the cam ring indicated at 24, each of the sliders 21 being provided at its upper end with a terminal portion comprising a needle engaging hook 25 and a latch engaging extension 26 for connecting the sliders with such needles as are present in the lower needle cylinder. The transfer butts 22 on the sliders 21 are utilized for transferring needles to the upper cylinder and may also be used for effecting a needle selection in the lower cylinder. If the transfer butts are to be used for a needle selection, they are made of different lengths as will be described more fully below. Knitting butts 23 of sliders 21 may also be of different lengths. Ordinarily, consecutive sliders constituting approximately one-half the circular series thereof will have short knitting butts for operating the needles during reciprocating work in knitting the heel and toe pockets, while the remaining sliders will have long knitting butts. A greater number of different lengths of knitting butts may be provided if desired.

The upper needle cylinder 30 is provided with a series of sliders 31 engaging the grooves thereof and having transfer butts 32 and knitting butts 33 for engaging cams in the upper cam ring 34. The sliders of the upper cylinder are each provided at their lower ends with a terminal portion comprising a needle engaging hook 35, and a latch engaging extension 36 for engaging the upper ends of the needles when they are transferred to the upper cylinder. The transfer butts 32 of the sliders in the upper cylinder are ordinarily of different lengths, short transfer butts being provided over the long knitting butts in the lower cylinder and long transfer butts being provided in the upper cylinder over the short knitting butts in the lower cylinder.

The needles indicated at 40 are each provided with the usual hooks 41 and latch (not shown) at each end. When the needles are in the lower cylinder, their lower hooks will engage the hooks 25 of the corresponding sliders 21 and the extensions 26 will engage the lower latches so that the needles will be operated by and with the sliders 21. When all of the needles 40 are in the lower cylinder, the machine is adjusted for plain knitting. For the production of rib knitting, certain of the needles will be transferred to the upper cylinder, whereupon their upper hooks will engage with the hooks 35 of the upper cylinder sliders 31 so that the needles will be actuated by the upper sliders. If the rib knit fabric is to have continuous vertical ribs, the same needles will be operated in the upper cylinder throughout the knitting of the fabric. If it is desired to produce Links-Links fabric, the needles are transferred back and forth from one cylinder to the other in predetermined sequence, so that certain needles operate at times in the upper cylinder and at other times in the lower cylinder. This results in the wales produced by these needles being composed partly of inwardly facing stitches produced by operation of the needles in the upper cylinder, and partly of outwardly facing stitches produced by operation of the needles in the lower cylinder. In certain of the operations hereinafter described, the desired distribution of needles between the upper and lower cylinders is effected by transferring all of the needles to the upper cylinder and retransferring selected ones of the needles back to the lower cylinder. Where reference is made in the description and claims to the transfer of needles from one cylinder to another, the expression designates the net result of the transferring operation unless otherwise appears from the context.

The upper needle cylinder is provided with an extension 42 having vertically movable selectors 43 located in grooves which form continuations of the grooves in the upper needle cylinder. Each of the selectors 43 has a leveling butt 43a for bringing all of the selectors to the same level and one or more selector butts 43b. The selector butts 43b are disposed at different levels, certain selectors having butts at one or more levels and other selectors having butts at other levels. In the arrangement illustrated in the drawings (Fig. 10) there are twelve selector butt positions, numbered 1 to 12 respectively. It will be understood that none of the selectors 43 will ordinarily have selector butts at all twelve levels, but each selector may have one or more butts at any of the levels desired. The selector butts are adapted to be engaged by selector levers arranged at corresponding levels as described more fully below to depress the selected ones of the selectors, and through engagement of the lower end of the selectors with the upper end of the sliders depress corresponding sliders to effect the transfer of corresponding needles from the upper to the lower cylinder.

The machine in accordance with the invention is provided with a plurality of thread feeding stations, two such stations being illustrated in the drawings. At each of the feeding stations there are provided suitable thread guides for feeding the thread to the needles, and suitable tension devices for applying tension to the thread. There will ordinarily be a plurality of thread guides and a corresponding number of tension devices at each feeding station, but for the sake of simplicity each station is represented in the drawings (Fig. 2) by a single thread guide, one of the feeding stations hereinafter referred to as the main feeding station, being represented by a thread guide 44 with a corresponding tension device 45 and a second feeding station being represented by a thread guide 46 with a corresponding tension device 47. The thread guides are shown in the drawings as being thread feed fingers of usual form and will be referred to generically as feed fingers. Suitable mechanism is provided for moving the feed fingers into and out of feeding position. In Figs. 10 to 17 of the drawings, the positions of the feeding stations are represented by dots carrying the same reference numerals as the thread guides representing the feeding stations in Fig. 2.

At the main feeding station the needles in the lower cylinder are manipulated by a center cam 48 and a main stitch cam 49 adapted to engage the knitting butts 23 of the sliders 21. The stitch cam 49 is movable in a vertical direction to regulate the length of stitch drawn by the needle. A similar stitch cam 51 is provided for knitting in a reverse direction when the needle cylinder is reciprocated, as in the formation of the heel and toe pocket. The direction of movement of the needles relative to the cam blocks in continuous circular knitting is indicated by the arrow at the top of Fig. 10. Following the main feeding station there is provided a stationary clearing cam 52 by-passed by a race-way 53. The passage of the knitting butts 23 of the sliders 21 through the race-way 53 is controlled by a shunt cam 54 movable into and out of operative position. When the shunt cam 54 is in operative position, the knitting butts 23 ride up the cam and up the face of cam 52, thereby raising the needles to clearing position, i. e., a position in which the previously drawn stitch is placed below the latch of the needle so that it will be cast off when the needle is again drawn down. When the shunt cam 54 is in inoperative position, the knitting butts 23 are by-passed through the race-way 53, so that the needles are not raised to clearing position, and the previously drawn stitches are retained on or above the latches of the needles.

Figure 5:
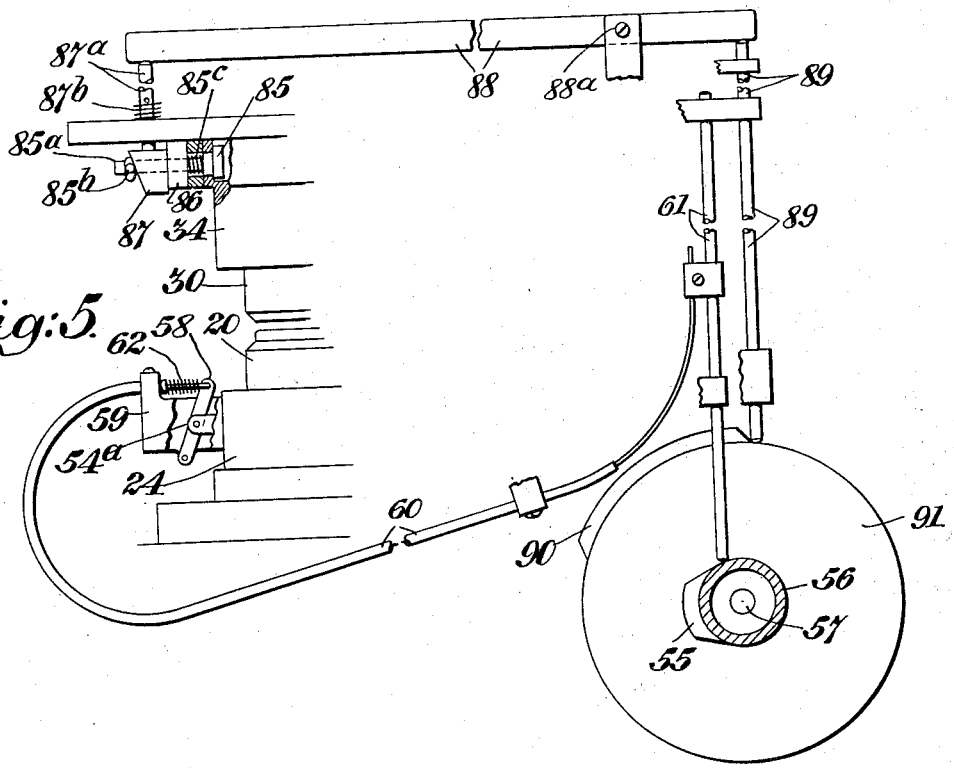
Fig. 5 is a schematic elevational view showing mechanism for operating shunt cams in the upper and lower cylinder cam blocks.
Figure 6:
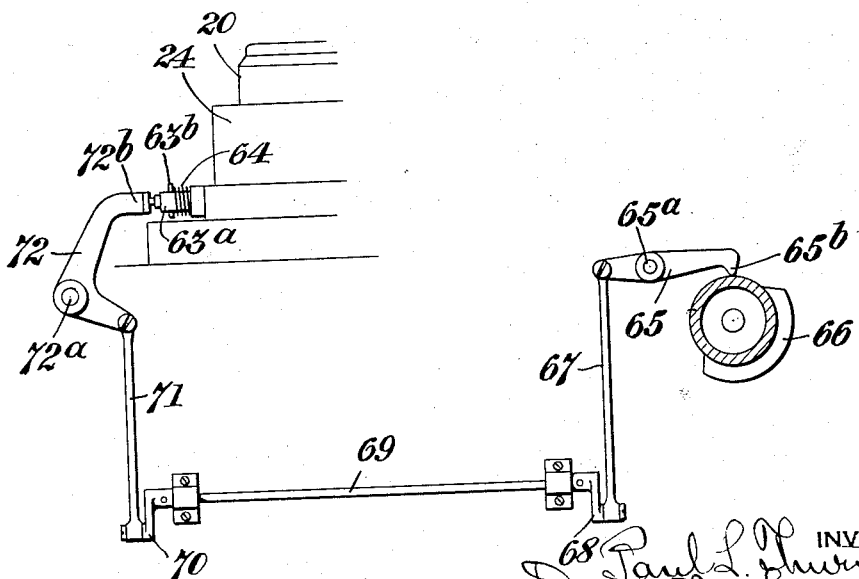
Fig. 6 is a schematic elevational view showing mechanism for operating a selecting cam in the lower cylinder cam block.

The movement of the shunt cam 54 into and out of operative position is controlled by a cam 55 on cam drum 56 on the main pattern shaft 57 by the mechanism shown in Figs. 1 and 5. In the arrangement illustrated, the shunt cam 54 is provided with a rearwardly extending projection 54a which is pivotally connected to a short arm 58, pivoted at its lower end to a bracket 59, provided on the lower cam ring 24. The upper end of the arm 58 is suitably connected, for example, by a Bowden cable 60, to a cam follower 61 adapted to engage the control cam 55. A compression spring 62 acting on the upper end of the pivoted arm 58 tends to move the shunt cam 54 radially inwardly to its operative position. When the cam follower 61 rides up on cam 55 of cam drum 56, the upper end of the pivoted arm 58 is pulled outwardly against the action of spring 62 to withdraw the shunt cam 54 to inoperative position.

The by-passing of knitting butts 23 of sliders 21 through the race-way 53 (Fig. 10) is further controlled by a selecting cam 63 which in the arrangement shown, is located approximately below the shunt cam 54 and is adapted to engage the transfer butts 22 of the sliders. In order to obtain a needle selection, the transfer butts 22 of sliders 21 are of different lengths so that the selecting cam 63 will engage the transfer butts of certain sliders only. The transfer butts that engage selecting cam 63 will ride up the face of the cam, thereby raising the sliders sufficiently to bring the knitting butts 23 of those sliders above the race-way 53 and into engagement with the clearing cam 52 whereby the needles will be raised to clearing position. Assuming that the shunt cam 54 is in inoperative position, the remaining sliders which are not engaged by selecting cam 63 will not be raised and their knitting butts will be by-passed through raceway 53. To obtain different needle selections or to obtain a needle selection around one portion only of the needle cylinder as for example in knitting the foot of a sock where it is desired to have a needle selection for the instep but not for the sole, the transfer butts 22 are made of at least three different lengths and the selecting cam 63 is radially movable so that it can be positioned to engage the long transfer butts only, or positioned to engage both the long and the medium transfer butts. In the arrangement shown in the drawings, the radial movement of selecting cam 63 from one position to another is controlled from the main pattern shaft by the mechanism illustrated in Figs. 1 and 6. The selecting cam 63 is carried by a radially movable plunger 63a extending out through the cam ring 24 and having a transverse pin 63b which is acted upon by a spring 64 tending to move the cam 63 to its outer position. Means for moving the selecting cam 63 to its inner position against the action of spring 64 comprises a cam follower 65 pivoted to a suitable support at 65a and having a cam engaging portion 65b adapted to engage a cam 66 on cam drum 56. The cam follower 65 is connected for example by a link 67, a crank 68, a shaft 69, a crank 70 and a link 71, with a bell crank lever 72 pivoted at 72a to a suitable support on the frame of the machine. The free end 72b of the bell crank lever 72 bears against the outer end of plunger 63a which carries selecting cam 63. When the cam engaging portion 65b of the cam follower 65 rides up on the high cam portion 66 on cam drum 56, the free end of the bell crank lever 72 is moved inwardly (to the right in Fig. 6), pushing the cam 63 to its inner position. When the cam engaging portion of the cam follower rides off of cam 66, the selecting cam 63 is moved to its outer position by the action of spring 64. The timing of the movement of the selecting cam will be explained in connection with the operation of the machine.

The shunt cam 54 and selecting cam 63 will ordinarily not be used at the same time. When the selecting cam 63 is being used, the shunt cam 54 will ordinarily be maintained in inoperative position, so that the knitting butts of the sliders not raised by the selecting cam 63 will be by-passed through race-way 53. When it is desired to by-pass all of the knitting butts 23, the shunt cam 54 is maintained in inoperative position and the selecting cam 63 is disconnected so that it will not engage any of the transfer butts. When the shunt cam 54 is in operative position, all of the knitting butts will be caused to ride up the face of the clearing cam 52, and the position of selecting cam 63 is hence immaterial. If desired, the selecting cam 63 may be made to move inwardly to engage all of the transfer butts so as to cause all of the knitting butts to ride up clearing cam 52, whereby the shunt cam 54 is rendered unnecessary.

Figure 11:
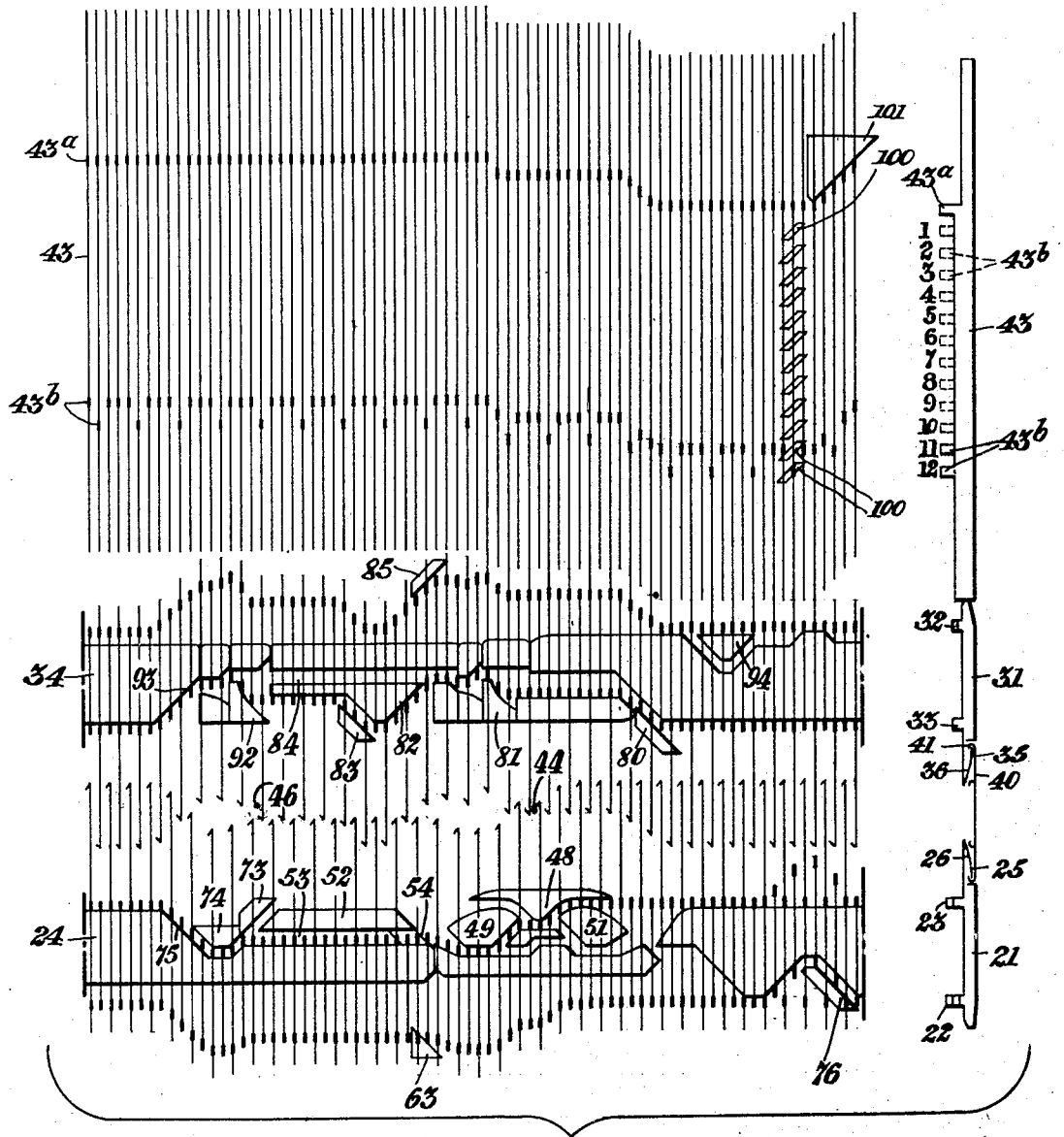
Fig. 11 is a view similar to Fig. 10 showing the formation of an anti-ravel course of the fabric of Figs. 20 and 21 by positioning alternate needles in the upper cylinder and feeding an elastic thread to upper cylinder needles only.

At the second feeding station represented by the feed guide 46 (Fig. 10), there are provided a draw down cam 73 and a stitch cam 74. The draw down cam 73 is movable radially into and out of operative position. The stitch cam 74 remains in operative position, but is adjustable vertically to regulate the length of the stitches drawn by the needles in the lower cylinder at the second feed. When the draw down cam 73 is in operative position, the knitting butts 23 of the sliders 21 which have been raised by clearing cam 52 ride down the face of cam 73 and continue down and under stitch cam 74 causing the needles to draw a stitch of the thread received at the second feeding station (Fig. 10). Knitting butts which are by-passed through the race-way 53 will be drawn down slightly by stitch cam 74 and pass underneath this cam (Fig. 11). It will be noted that when the knitting butts of the sliders are caused to ride up over clearing cam 52 either by reason of the engagement of the knitting butts with shunt cam 54, or engagement of the transfer butts with selecting cam 63 (Fig. 17), the corresponding needles in the lower cylinder are raised high enough to receive the thread fed at the second feeding station and will draw stitches of this thread when drawn down by cam 73 and stitch cam 74. When the knitting butts are by-passed through the race-way 53, the corresponding needles are kept so low that they do not receive thread fed at the second feeding station (Figs. 11 and 17) and retain the stitches of thread drawn at the main feeding station.

Beyond the draw down cam 73 and the stitch cam 74, there is provided a secondary clearing cam 75 for raising all of the needles to clearing position preparatory to receiving the thread fed at the main feeding station. The lower cam ring 24 is also provided with a transfer cam 76 adapted to engage transfer butts 22 of sliders 21 for transferring all or certain of the needles to the upper cylinder as is usual in the coaxial type of knitting machine. As the mechanism for operating the transfer cam may be of usual form, it will not be further described.

The upper cam ring 34 is provided adjacent the main feeding station 44 with a positioning cam 80 adapted to engage the knitting butts of the sliders in the upper cylinder to position the upper cylinder needles to receive thread fed at the main knitting station and a main stitch cam 81 adapted to engage the knitting butts of the sliders to cause the upper cylinder needles to draw stitches of the thread received. Following the main feeding station there is provided a descending cam 82 adapted to engage the knitting butts to move the sliders and associated needles downwardly. In the form of the invention shown in Fig. 10, cam 82 is of sufficient height to move the needles downwardly to clearing position and thus constitutes a clearing cam for the main feeding station. In the form shown in Fig. 15, cam 82 is cut off so that it does not move the needles to clearing position, and the needles hence retain the stitches drawn by stitch cam 81 at the main feeding station. Following the descending cam 82 there is provided a second positioning cam 83 for raising the needles to proper position to receive thread fed at the second feeding station 46.

By-passing the descending cam 82 there is provided an upper race-way 84 for the knitting butts of the upper cylinder sliders. The passage of the knitting butts through race-way 84 is controlled by an upper shunt cam 85 which is adapted to engage the transfer butts of the sliders and is movable radially into and out of operative position. When the shunt cam 85 is in operation, it engages the transfer butts 32 and moves the sliders down sufficiently that the knitting butts 33 engage descending cam 82 and ride down the face of the latter cam. When shunt cam 85 is in inoperative position, the sliders are not depressed and the knitting butts pass through race-way 84. It will be seen (Fig. 11) that when shunt cam 85 is in operative position to cause the knitting butts to ride down the face of descending cam 82 and up cam 83 the needles are properly positioned to receive the thread fed at the second feeding station 46. When the upper shunt cam 85 is withdrawn, allowing the knitting butts to be by-passed through race-way 84, the needles are kept at a higher level so that they will not take the thread fed at the second feeding station, and will retain the stitches drawn at the main feeding station (Fig. 10). If desired, the upper transfer butts may be of different lengths, and the shunt cam 85 may be positioned so as to cause certain of the sliders to be moved downwardly by cam 82 while permitting the knitting butts of other sliders to be by-passed through upper race-way 84.

Suitable mechanism is provided for moving the upper shunt cam 85 into and out of operative position, one arrangement of such mechanism being shown by way of example in Figs. 1 and 5. In the arrangement shown, the upper shunt cam 85 is carried on the inner end of a radially movable plunger 85a, which extends through a bushing 86 and has at its outer end a transverse pin 85b. A spring 85c tends to move the shunt cam inwardly to operative position. The outer end of the plunger 85a is straddled by a bifurcated cam block 87, carried by a vertically movable spindle 87a, and having inclined cam surfaces engaging the transverse pin 85b. A spring 87b tends to move the cam block and spindle upwardly. One end of a rocking lever 88 pivoted at 88a, bears on the upper end of spindle 87a while the other end of the lever bears on the upper end of a vertically movable lifter rod 89, the lower end of which is adapted to engage a cam 90 on cam drum 91 carried by the main pattern shaft 57. When the lifter rod 89 rides up on the cam 90, the cam block 87 carried by spindle 87a will be moved downwardly and the inclined surfaces of cam block 87 will engage the transverse pin 85b to move upper shunt cam 85 radially outwardly to inoperative position.

Figure 10A:
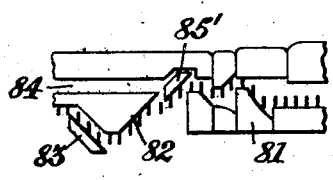
Fig. 10a is a fragmentary view showing an alternative cam arrangement.

Instead of operating on the transfer butts 32 of the upper sliders 31, the upper shunt cam may act on the knitting butts 33 as illustrated in the alternative arrangement shown in Fig. 10a. The shunt cam in this figure is indicated by the numeral 85'. The action and operation of the cam may be the same as heretofore described.

At the second feeding station the upper cam ring 34 is provided with a stitch cam 92 adapted to engage the knitting butts of the sliders to draw the upper cylinder needles upwardly, thereby drawing loops of thread received at the second feed. It will be understood that loops are drawn by the needles only when the latter have been moved downwardly by descending cam 82 to position them at a sufficiently low level to take the thread fed at the second feeding station. When the knitting butts of the sliders are by-passed through upper race-way 84, the needles will not take the second thread and will retain previously drawn stitches of thread received at the main feeding station. The stitch cam 92 is preferably vertically adjustable to regulate the amount of thread drawn by the needles at the second feed.

Beyond the stitch cam 92, there is provided a stationary clearing cam 93. The upper cam ring is also provided with a transfer cam 94, adapted to engage transfer butts of upper cylinder sliders to transfer needles from the upper to the lower cylinder. The upper transfer cam 94 is located slightly beyond the lower transfer cam 76 in the direction of travel of the needles in order that all or certain of the needles transferred to the upper cylinder by cam 76 may be retransferred to the lower cylinder before reaching the main feeding station. Cam 94 is at such height that the transfer butts of the upper cylinder sliders will pass above it as illustrated in Fig. 10, unless the sliders are slightly depressed before reaching the transfer cam. It is the function of the selectors 43 to depress selected ones of the upper cylinder sliders to cause corresponding needles to be transferred to the lower cylinder by transfer cam 94 while other needles remain in the upper cylinder. In some instances there may be provided an auxiliary transfer cam 95 (Fig. 17) which is radially movable into and out of operative position and is adapted to engage the transfer butts of all or certain of the sliders to depress them sufficiently to be engaged by transfer cam 94. Suitable mechanism is provided for moving the auxiliary transfer cam into and out of operative position.

Mechanism for actuating the selectors 43 is illustrated in Figs. 1, 7, 8, 9 and 10. At each of the levels corresponding to the levels of selector butts 43, there is provided a selector lever 100 having a cam incline 100a adapted to engage selector butts disposed at a corresponding level to move associated selectors downwardly. A leveling cam 101 located slightly in advance of the selector levers 100 engages leveling butts 43a to position all of the selectors at the proper level for engagement of the selector levers with the selector butts. Each of the selector levers 100 is pivoted on a vertical shaft 102 and the end of the selector lever opposite the cam incline 100a is bifurcated to provide a heel portion 100b and a toe portion 100c. A leaf spring 103 engages the portion 100b of each selector lever and tends to swing the lever into operative position to engage selector butts of the selectors. Movement of the selector levers 100 to inoperative position is effected by a pattern drum 104 having projections 104a adapted to engage the toe portion 100c of the selector levers to swing the cam inclines of the levers out of the paths of the selector butts. The projections 104a are preferably in the form of removable pins which may be inserted or removed to give the desired pattern. It will be understood that the projections 104a are arranged at levels corresponding to the levels of the selector levers. The pattern drum 104 is mounted on a shaft 105 to which, step by step rotary movement is imparted by a pawl and ratchet mechanism comprising a ratchet wheel 106 mounted on the shaft and a pawl 107 carried by a pivoted arm 108 adapted to be engaged by a projection carried on the extension 42 of the upper needle cylinder. The pattern drum is moved forward one step each revolution of the cylinder. When the toe portion 100c of a selector lever rides up on one of the projections 104a on the pattern drum, the selector lever is swung to inoperative position. Where there is no projection 104a, the selector lever 100 drops into operative position and engages any selector butts disposed at a corresponding level moving the selectors downwardly to bring the transfer butts 32 of sliders 31 into engagement with transfer cam 94 and thereby effecting the transfer of corresponding needles to the lower cylinder. The needles associated with selectors which have no selector butts disposed at any of the levels corresponding to the levels of selector levers in operative position will remain in the upper cylinder.

A feature of the present invention is the independent control of separate sets of selector levers to maintain one set of levers inoperative, while levers of another set are moved into and out of operative position through successive cycles of operation. It will be understood that a pattern set up on the pattern drum will be repeated each revolution of the drum. For example if every other selector is provided with a selector butt at number one level to transfer alternate needles to the lower cylinder, when the number one selector lever is in operative position and if the corresponding row of projections on the pattern drum has one projection missing so as to allow the number one selector lever to drop into operation for one course, then the machine will produce one course of 1 x 1 rib knitting at that point in each revolution of the pattern drum where there is no projection in the number one level. As a result of this repetition of the pattern, the difficulty has been encountered that if it were attempted, for example, to use one or more of the selector levers to obtain a particular needle selection in making the selvage and top portion of a sock, and other selectors for producing a Links-Links pattern in the leg portion, the needle selection used for the top and selvage will recur during the knitting of the leg and destroy the pattern effect desired. This difficulty is overcome in accordance with the present invention by providing means for independently controlling separate sets of the selector levers. Speaking of sets of selector levers, it will be understood that the division of the levers into sets may be made in any way desired. For example, where there are twelve selector levers, one lever may constitute one set and the other eleven levers the other set, or the division may be two and ten, three and nine, etc. In the arrangement illustrated by way of example in the drawings, the levers are shown as being divided into two separate sets. However, it will be understood that there may be three or more sets if desired.

The independent control of separate sets of selector levers may be effected by dividing the pattern drum into two or more sections so that one section of the drum may be rotated while another section is held stationary. However, it has been found to be more convenient to rotate the pattern drum as a unit and obtain the independent control by blocking out the levers of one or another set so that they will not be operated by the projections on the pattern drum. In the arrangement shown in the drawings (Figs. 1, 7, 8 and 9) there is provided a bar 109 for blocking one set of selector levers to maintain them in inoperative position, and a separate bar 110 for blocking another set of selector levers to maintain them in inoperative position. The upper bar 109 is pivoted to swing about a vertical shaft 111 and is connected by a link 112 to an arm 113 on a vertical shaft 114. At the lower end of the shaft 114 there is provided an arm 115, the outer end of which is adapted to engage a cam 116 on the end face of a drum 117 on the main pattern shaft 57 (Figs. 1 and 7). When the arm 115 rides up on cam 116, the shaft 114 is rotated in a clockwise direction as viewed in Fig. 7, and through link 112, the upper blocking bar 109 being likewise swung in a clockwise direction about its pivot shaft 111, causing the bar to press against the heel portions 100b of certain selector levers 100, thereby swinging the selector levers to inoperative position against the action of spring 103.

The lower blocking bar 110 (Figs. 8 and 9) is likewise pivoted about vertical shaft 111 and has a projecting arm 110a which is engaged by one end of a bell crank lever 118 pivoted to a suitable support at 118a. The other end of bell crank lever 118 is connected to a lifter rod 119, the lower end of which is pivotally connected to the elbow of a bell crank lever 120, one end of which is pivoted to a bracket 121 and the other is adapted to engage a cam 122 on cam drum 56. When the end of bell crank lever 120 rides up on a high portion of cam 122, the lifter rod 119 will be raised, thereby raising the outer end of bell crank lever 118 and rocking the inner end downwardly and outwardly against the arm 110a projecting from bar 110. This will swing the bar 110 in a clockwise direction as viewed in Fig. 8 against the heel portions 100b of certain of the selector levers 100, thereby maintaining the selector levers in inoperative position. In the particular arrangement illustrated in Figs. 7 to 10, the upper bar 109 controls the ten upper selector levers while the lower bar 110 controls the two lower selector levers. However, the number of levers controlled by each bar can be varied at will by varying the relative lengths of the two bars. If it is desired to divide the selector levers into three or more separately controlled sets, a corresponding number of blocking bars may be provided.

When the upper set of selector levers is maintained in inoperative position by the bar 109, the operation of the selectors and hence the transfer of needles from the upper to the lower cylinder is controlled solely by the selector levers of the lower set which may be moved into and out of operative position by arrangement of the projections on pattern drum 104 to give the fabric structure desired. Conversely, when the lower set of selector levers is maintained in inoperative position by bar 110, the operation of the selectors is controlled solely by the selector levers of the upper set. It is thus possible to produce one section of fabric of a particular structure by using the selector levers of one set and to produce a subsequent section of fabric of different structure by using the selector levers of the other set while maintaining the first set inoperative. The capabilities of the machine will be more fully understood from the following description of various fabric structures produced in accordance with the invention, and the method steps incident to their production.

For the sake of convenience in describing the fabric structure produced in accordance with the invention, the horizontal rows of stitches referred to as courses are numbered consecutively as C1, C2, C3, etc., and the vertical rows of stitches referred to as wales are numbered consectively as W1, W2, W3, etc. As different forms of fabric structure embodying the invention are illustrated in different figures of the drawings, and as the courses and wales in each figure showing fabric structure are numbered consecutively, it does not follow that like numbered courses in different figures will have the same structure. However, if it is kept in mind that the consecutive numbering of the courses and wales in each figure is merely for convenience in referring to respective courses and wales by their location in the fabric and that the numerals employed do not designate particular structural characteristics, it is thought that no confusion will arise. In some instances where it is desired to refer to the characteristics of the thread forming a particular course the thread itself will be designated by a suitable reference character in addition to the numbering of the course.

A general characteristic of fabric produced in accordance with the present invention is that it embodies combinations of stitch structure not heretofore obtainable. A further characteristic of the invention in certain of its forms is that the resulting fabric is composed of at least two threads extending coursewise through the fabric, one of the threads forming inwardly facing stitches and outwardly facing stitches and the other thread being incorporated at inwardly facing stitches and floated behind at least certain of the outwardly facing stitches of the first mentioned thread. Various forms of fabric illustrating the invention are shown in Figs. 18 to 32, certain forms being shown embodied in an article of hosiery.

Figure 19:
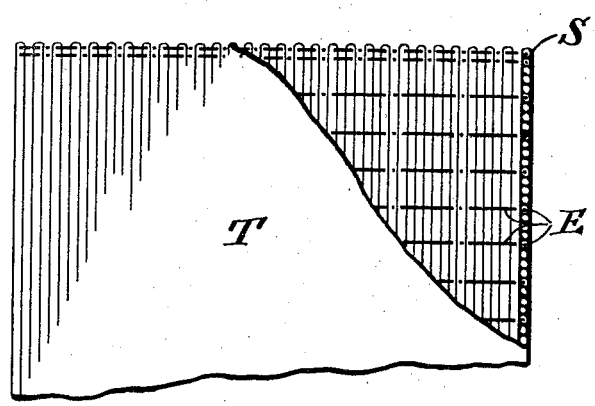
Fig. 19 is an enlarged diagrammatic view of the top portion of the sock of Fig. 18 partially broken away to show the inner face of the fabric.
Figure 18:
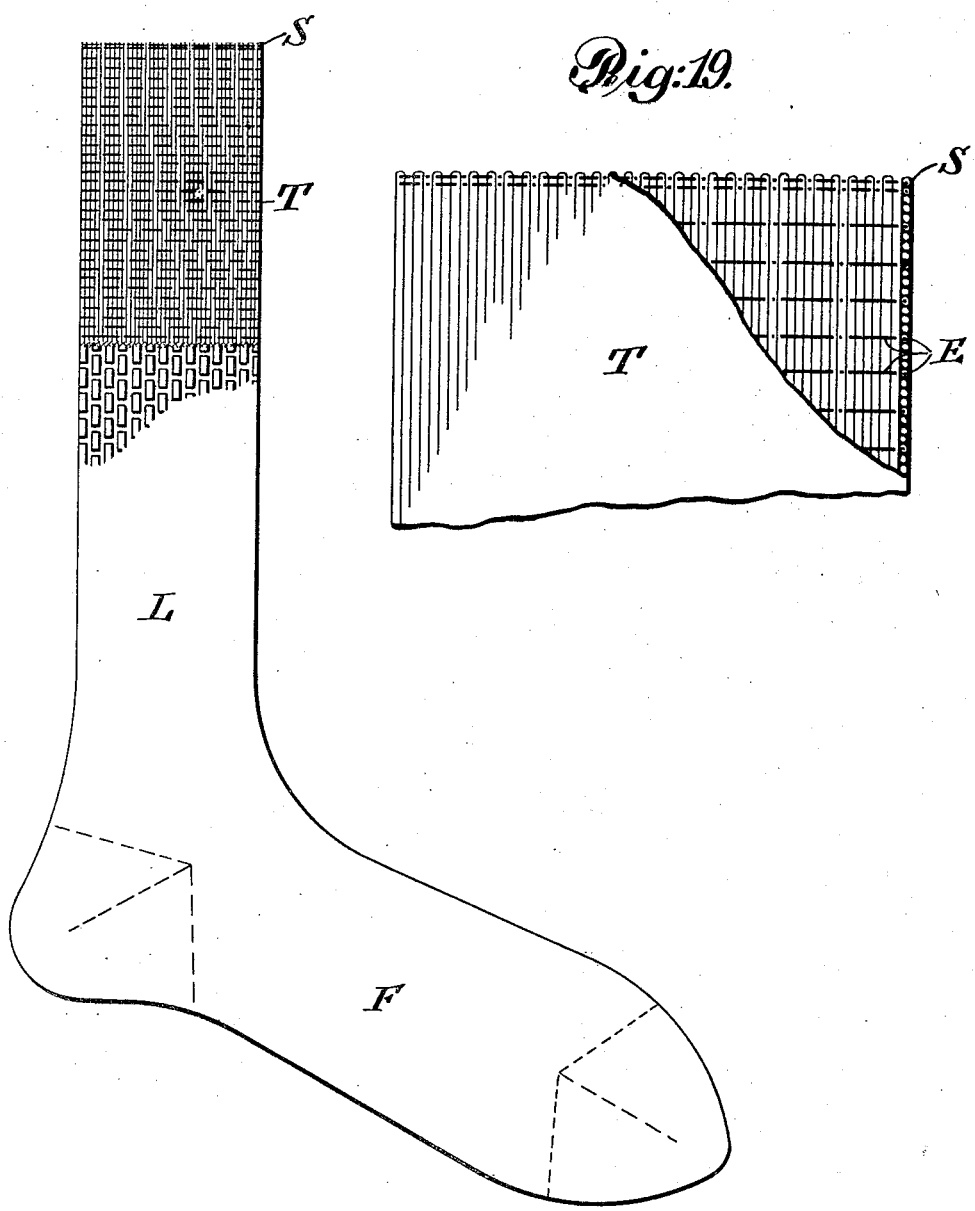
Fig. 18 is a side view of a sock made in accordance with the invention.
Figure 20:
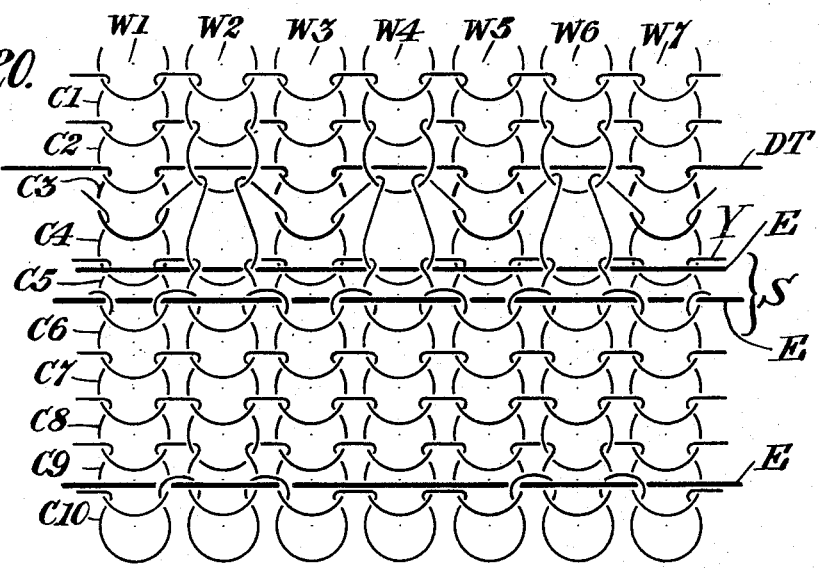
Fig. 20 shows diagrammatically a section of fabric produced in making the sock of Figs. 18 and 19 by string work.
Figure 21:
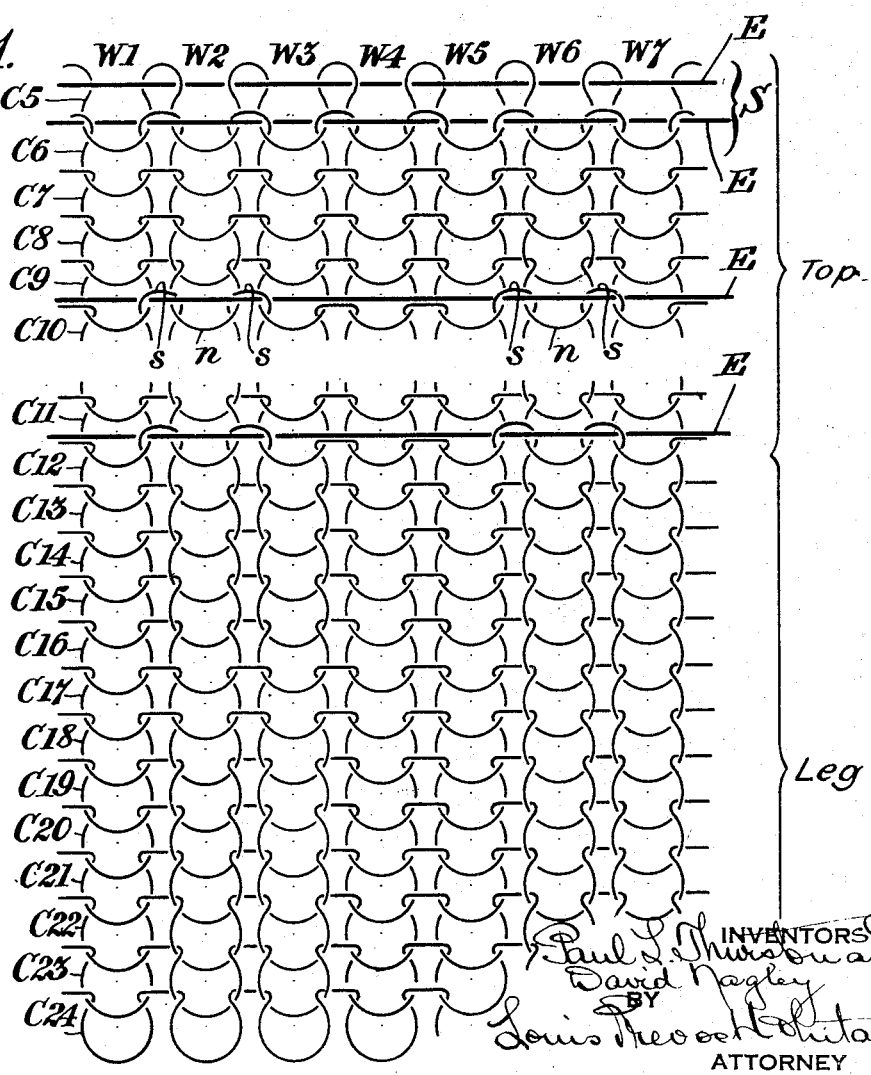
Fig. 21 is a view similar to Fig. 20 showing the draw thread and ravel courses removed.

In Figs. 18 and 19 there is shown an article of hosiery produced in accordance with the present invention and comprising a form-fitting and self-supporting top portion T, having a selvage edge S, a leg portion L and a foot portion F. The articles of hosiery illustrated in finished form in Figs. 18 and 19 are preferably produced by string work, by which is meant that the articles are produced as a continuous string of socks which are thereafter severed from one another, and completed by closing the toe pocket. The stitch structure of a section of string work at the point of junction between successive socks is shown in Fig. 20, while the stitch structure of a section of the top portion and leg portion of the finished sock is shown in Fig. 21. Figs. 20 and 21 represent the inner face of the fabric. Referring to Fig. 20, the first complete course of stitches C1, is one of a plurality of ravel courses forming the loopers edge of the preceding sock. As these courses are subsequently raveled out, their stitch structure is immaterial, but course C1 is illustrated as being a plain knit course, i. e., all of the stitches face outwardly. Subsequent course C2 is a course of 1 x 1 rib knitting having outwardly facing stitches at odd numbered wales alternating with inwardly facing stitches at the even numbered wales. Course C3 is formed of a draw thread DT, knit at alternate wales only, for example at the odd numbered wales and floated behind the intervening wales. Course C4 is another course of 1 x 1 rib knitting having outwardly facing stitches drawn through the loops of the draw thread at the odd numbered wales and inwardly facing stitches drawn through the inwardly facing loops of course C2 at the even numbered wales. Course C5 is a further course of 1 x 1 rib knitting in which alternate loops of a relatively non-elastic fabric yarn or thread indicated by the letter Y are drawn to one side of a coursewise extending elastic thread E, while the remaining loops of fabric thread are drawn to the opposite side of the elastic thread. As illustrated in Fig. 20, the loops of fabric thread at odd numbered wales are drawn in front of the elastic thread E, while loops of fabric thread at even numbered wales are drawn behind the elastic thread, it being kept in mind that Fig. 20 represents the inside of the fabric. This forms an anti-ravel structure which in the finished article constitutes the selvage edge of the sock. To reinforce the selvage there may be a second anti-ravel course C6 in which loops of fabric thread are drawn alternately to opposite sides of the elastic thread E. Course C6 is shown as a plain knit course with all of the stitches facing outwardly.

The fabric forming the self-supporting top portion T of the sock shown in Figs. 18 to 21 is of novel structure comprising spaced rib knit courses separated by intervening plain knit courses and having an elastic thread caught into the fabric at inwardly facing stitches of the rib knit courses and floated behind intervening outwardly facing stitches. As shown in Fig. 21 the selvage courses C5 and C6 may be followed by one or more plain knit courses, for example, C7 and C8. There is then formed a rib knit course C9 which is illustrated as 1 x 3 rib knitting with inwardly facing stitches at wales W2 and W6 and outwardly facing stitches at wales W1, W3, W4, W5, etc. An elastic thread E, extending coursewise of the fabric adjacent the rib knit course C9 is caught into the fabric at the inwardly facing stitches at wales W2 and W6 and is floated behind the intervening outwardly facing stitches. In the particular structure shown, the elastic thread is held between the needle loops n, of the inwardly facing stitches of the rib knit course, and the adjacent sinker loops s of a succeeding course C10 of plain knit stitches. The top portion of the sock is continued in like manner with spaced rounds of elastic thread incorporated in the fabric at spaced rib knit courses separated by one or more intervening plain knit courses. To avoid repetition, Fig. 21 shows only the beginning and the end of the top portion indicating a final rib knit course C11 followed by a plain knit course C12. The spacing of successive rounds of elastic thread and the corresponding spacing of the rib knit courses is apparent from Fig. 19.

The leg portion of the sock shown in Figs. 18 and 21 is composed of inwardly facing stitches and outwardly facing stitches arranged to form a Links-Links pattern. As illustrated in Fig. 21, courses C13 to C16 have outwardly facing stitches at wales W1, W4 and W5, alternating with inwardly facing stitches at wales W2, W3, W6, and W7. Courses C17 and C18 have outwardly facing stitches at wales W1 to W5 and inwardly facing stitches at wales W6 and W7. Courses C19, C20 and C21 have outwardly facing stitches at wales W1, W4 and W5, alternating with inwardly facing stitches at wales W2, W3, W6 and W7. This arrangement of the stitches produces the Links-Links pattern indicated diagrammatically in Fig. 18. It will be understood, however, that the stitches may be arranged to produce any pattern desired.

Figure 13:
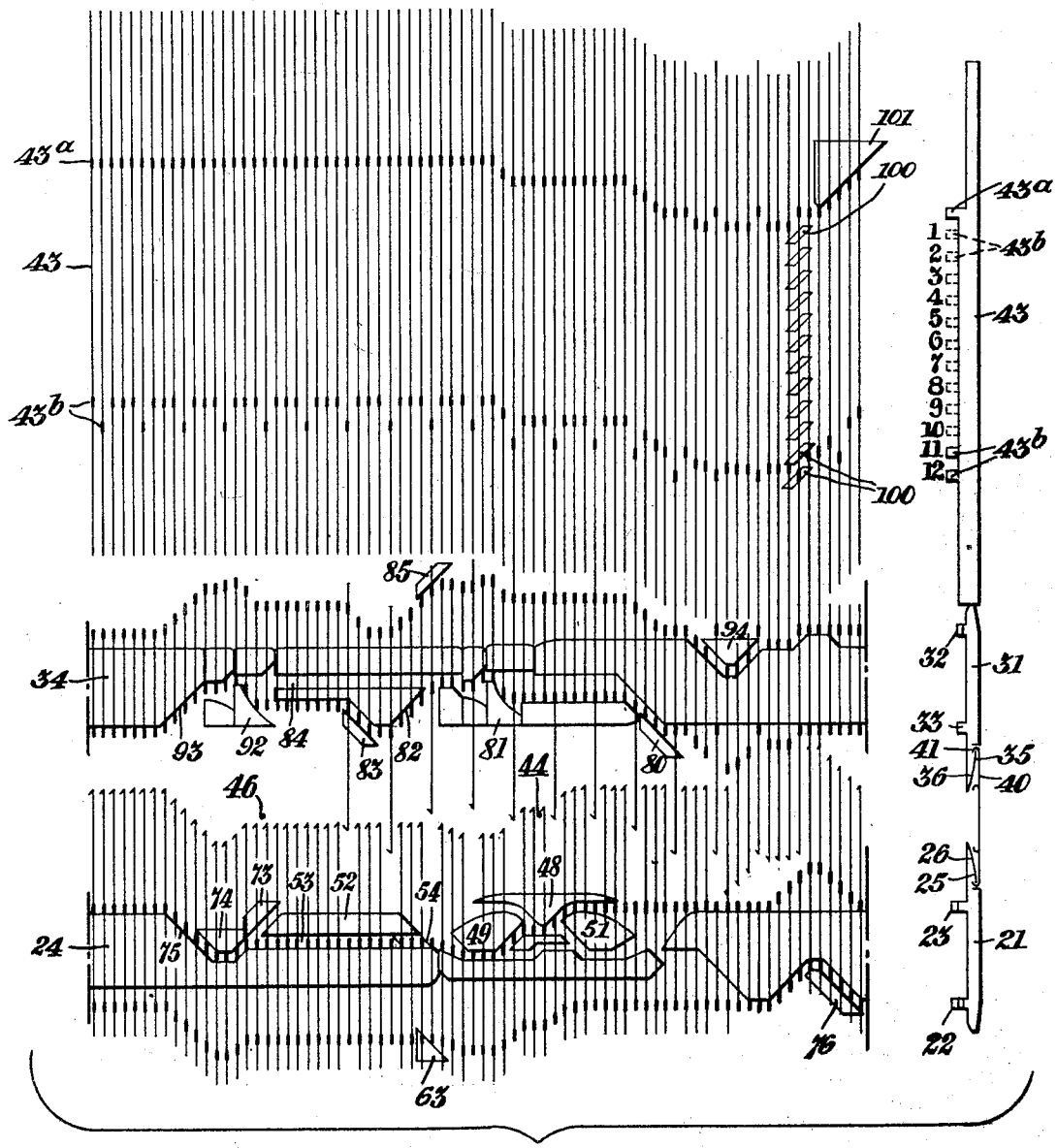
Fig. 13 is a view similar to Fig. 10 showing the transfer of spaced needles to the upper cylinder to form one of the rib knit courses of the fabric of Figs. 20 and 21.
Figure 14:
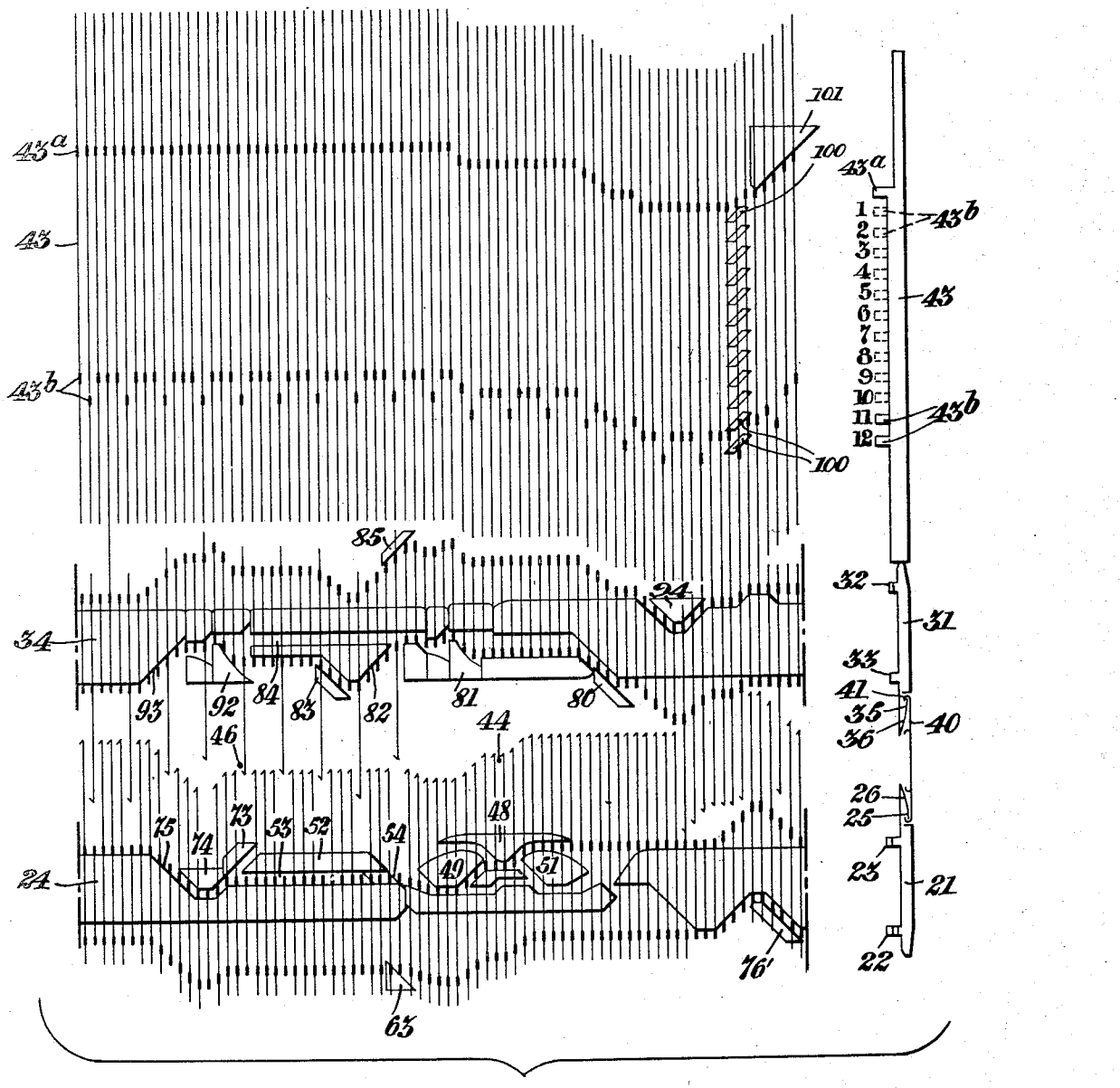
Fig. 14 is a view similar to Fig. 10 showing the elastic thread being received by the upper cylinder needles only during the knitting of one of the rib knit courses of the fabric of Figs. 20 and 21, and showing also the subsequent transfer of all of the needles to the lower cylinder to form a succeeding plain knit course.
Figure 15:
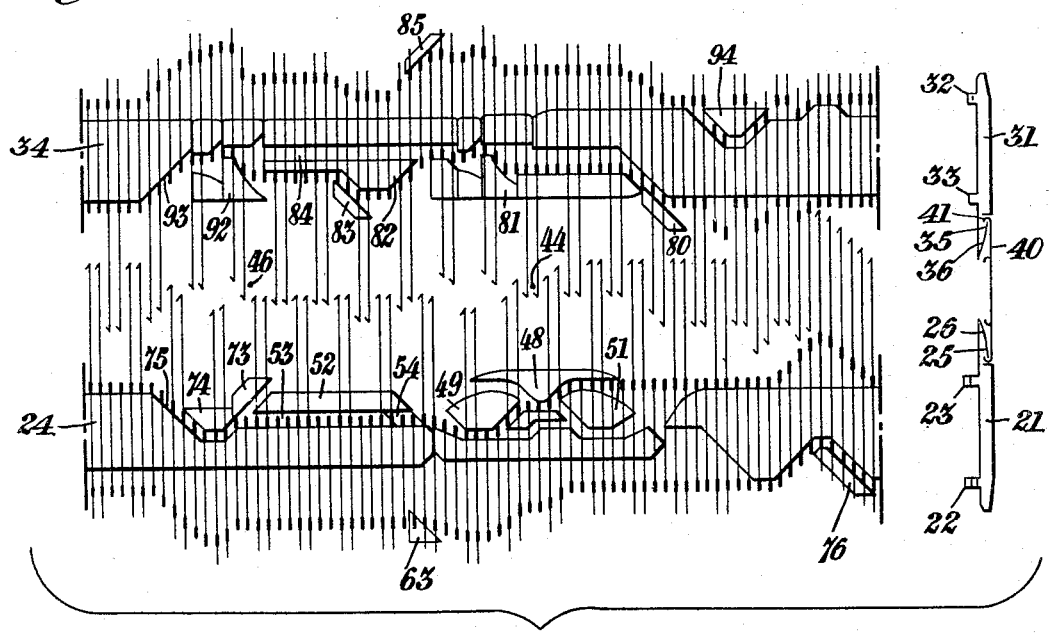
Fig. 15 is a view similar to Fig. 10 showing the incorporation of elastic thread in 2 x 2 rib fabric to form the top portion of the sock shown in Figs. 22, 23, and 26. The selectors are omitted.

The method of producing the article of hosiery shown in Figs. 18 and 19 is illustrated in Figs. 10 to 14 in conjunction with Figs. 20 and 21. With all of the needles in the lower cylinder, thread is fed to the needles at the main knitting station to knit a plurality of plain knit courses forming a loopers edge for the preceding sock. When a sufficient number of plain knit courses has been formed the lower transfer cam 76 is moved in far enough to engage the transfer butts of alternate sliders, which in this instance have been provided with longer transfer butts, thereby transferring alternate needles to the upper cylinder, as shown in Fig. 10. The feeding of thread at the main knitting station is continued so that as soon as the first of the transferred needles reach the main feeding station the needles in the upper and lower cylinders will coact to produce 1 x 1 knitting, forming the course C2 of Fig. 20. Cam 54 is in operative position causing the knitting butts of the lower sliders to ride up over clearing cam 52 while upper shunt cam 85 is in inoperative position, allowing the knitting butts of the upper sliders to be by-passed through race-way 84, these cams having been moved to their respective positions during the knitting of the preceding sock. At any time after the first of the transferred needles reaches the second feeding station, draw down cam 73 is moved in against the ends of the short knitting butts of the lower sliders and picks up the first of the long knitting butts, whereupon the cam completes its movement into operative position. It will be seen that the knitting butts of the lower sliders will now ride down the face of cam 73 and under stitch cam 74. As the first of the knitting butts engage draw down cam 73, a draw thread feed finger is moved into operative position at the second feeding station. By referring to Fig. 10, it will be seen that whereas the thread at the main feeding station is fed to and knit by the needles of both cylinders the draw thread fed at the second knitting station is received and knit by lower cylinder needles only the upper cylinder needles being by-passed at a higher level so that they do not take the draw thread but retain the stitches drawn at the main feeding station. This results in the draw thread being knit at alternate wales only of the fabric as illustrated at course C3 in Fig. 20. When the needles which have received the draw thread again reach the main feeding station where thread is being fed to the needles of both cylinders, the lower cylinder needles will draw new loops of thread through the previously formed loops of draw thread, while the upper cylinder needles will draw new loops of thread through the loops previously drawn at the main knitting station in the previous revolution of the needle cylinder. This produces the course C4 of Fig. 20. Any desired number of draw thread courses may be produced, but 1½ courses will ordinarily be sufficient. Thereupon, lower shunt cam 54 is partially withdrawn during the passage of the long knitting butts of the lower sliders allowing the first of the short knitting butts to be by-passed through lower race-way 53 as shown in Fig. 11. At approximately the same time, or shortly thereafter, upper shunt cam 85 is moved into operative position causing the knitting butts of the upper sliders to ride down cam 82 (Fig. 11) to clearing position and then up the face of positioning cam 83. The draw thread feed finger is withdrawn and a finger feeding elastic thread is moved into operative position at the second feeding station in time to feed elastic thread to the first of the needles which are moved down to clearing position by cam 82. It will be seen (Fig. 11) that while the thread fed at the main knitting station is received by the needles of both cylinders, the elastic thread fed at the second feeding station is received by upper cylinder needles only, the lower cylinder needles being by-passed at too low a level to receive the elastic thread. As the knitting butts of the upper sliders ride up stitch cam 92, the upper cylinder needles draw loops of the elastic thread, thereby withdrawing a measured quantity of elastic thread from the feed finger. By adjusting the tension on the elastic thread and varying the height of cam 92, any desired amount can be uniformly withdrawn. However, in producing the fabric structure of Fig. 20, cam 92 should not raise the upper cylinder needles high enough to cast off the stitches of fabric thread drawn at the main feeding station. Alternatively, cam 82 may be cut off as shown in Fig. 15, so that the upper cylinder needles will not be lowered to clearing position and will hence retain the previously drawn stitches in the hooks. In either case the upper cylinder needles will retain the stitches drawn at the main feeding station, and after drawing loops of elastic thread at the second feeding station, the upper cylinder needles will be moved downwardly by cam 93 to clearing position placing both the elastic thread and the previously drawn loop of fabric thread behind, i. e., above, the latches of the upper cylinder needles. When the needles again reach the main feeding station and fabric thread is fed to the needles of both cylinders, the loops of fabric thread drawn by the upper cylinder needles will be on the opposite side of the elastic thread from the loops drawn by the lower cylinder needles. This produces the anti-ravel structure shown in course C5 of Fig. 20. As many anti-ravel courses may be produced as desired, but one or two such courses will ordinarily be sufficient.

Figure 12:
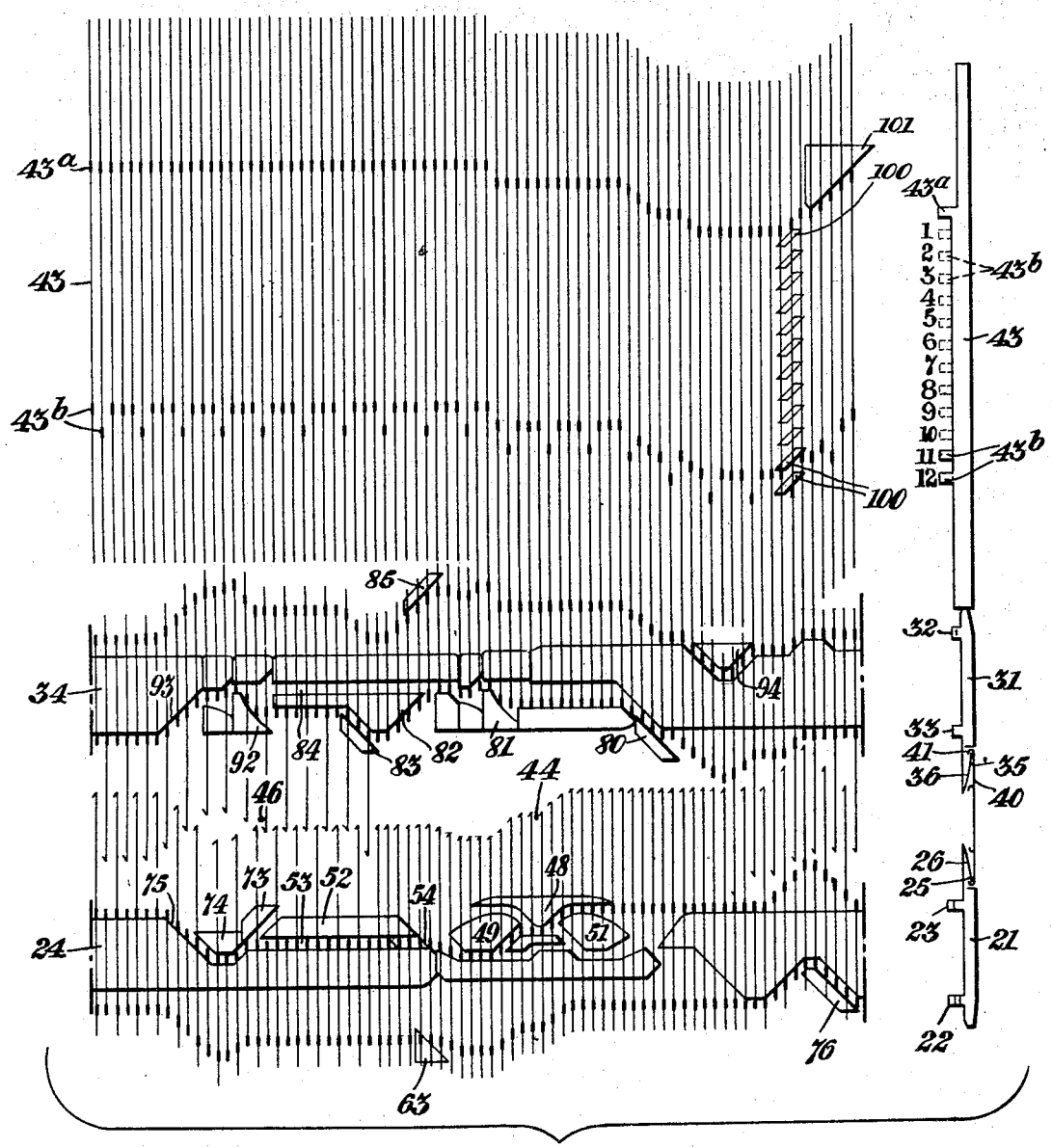
Fig. 12 is a view similar to Fig. 10 showing the transfer of all of the needles to the lower cylinder to form a plain knit course of the fabric shown in Figs. 20 and 21.

When the last of the needles that are to take the elastic thread in forming the anti-ravel course or courses of the selvage have reached the transfer station, the lower transfer cam 76 is moved in all the way to transfer all needles to the upper cylinder. At the same time, or before, the blocking bar controlling one set of selector levers, in this case blocking bar 110 (Fig. 9) controlling the selector levers at number 11 and number 12 positions is withdrawn, freeing the selector levers and the pattern drum 104 is timed to start racking. The projections on the pattern drum are so arranged that both the number 11 and the number 12 selector levers drop into operative position. With the selector butt arrangement shown in Figs. 10 to 14 wherein every fourth selector has a butt at number 12 level and the remaining selectors have butts at number 11 level, the movement of selector levers number 11 and number 12 into operative position results in re-transferring all of the needles to the lower cylinder, as illustrated in Fig. 12. When the needles again reach the main feeding station, they are all in the lower cylinder where they receive the fabric thread and draw loops thereof to form a course of plain knit stitches. During the transfer operation the needles which were formerly in the upper cylinder retain both the elastic thread received at the second feeding station and the previously drawn loops of fabric thread received at the main feeding station, and when the main feeding station is again reached, the plain knit stitches of fabric thread are drawn alternately to opposite sides of the elastic thread, thereby tying in the elastic and forming the course C6 in Fig. 20.

In the position shown in Fig. 12, transfer of all the stitches to the lower cylinder has progressed almost to the second feeding station. When the last of the needles in the upper cylinder has passed the second feeding station, no more elastic thread will be drawn from the feed finger, since all subsequent needles are in the lower cylinder and are by-passed at a level too low to receive the elastic thread. Hence, the feeding of the elastic thread is interrupted although the elastic feed finger need not be withdrawn and no alteration need be made in the cams actuating the sliders. The knitting of plain knit courses is continued to form as many such courses as are desired, for example, courses C6, C7 and C8 in Fig. 20. The selector lever in number 12 position is then withdrawn from operation for one revolution of the needle cylinder, by a suitably positioned projection on pattern drum 104. Upon the withdrawal of number 12 selector lever, every fourth needle will be permitted to remain in the upper cylinder after transfer of all of the needles to the upper cylinder, upon transfer by the lower transfer cam 76, the intervening needles being retransferred to the lower cylinder by selector lever number 11. This results in a net transfer of every fourth needle to the upper cylinder as illustrated in Fig. 13 where the transfer has progressed almost to the second feeding station. The feeding of fabric thread to all of the needles is continued at the main feeding station where the spaced upper cylinder needles will draw inwardly facing stitches and the intervening lower cylinder needles will draw outwardly facing stitches. When the transferred needles reach the second feeding station, the spaced needles in the upper cylinder will receive the elastic thread as illustrated in Fig. 14, while the lower cylinder needles will be by-passed at a level too low to receive said thread. After a complete revolution of the needle cylinder, the number 12 selector lever is returned to operative position, thereby resulting in the transfer of all needles to the lower cylinder (Fig. 14). During the knitting of the subsequent plain knit course, the tying in of the elastic thread received by upper cylinder needles at the second feeding station is completed, the elastic being held between the needle loops of the inwardly facing stitches of the rib knit course, and the adjacent sinker loops of the succeeding plain knit course. The periodic transfer of spaced needles to the upper cylinder to form spaced rib knit courses separated by intervening plain knit courses is continued to form a self-supporting top portion of desired length for the article of hosiery, the elastic thread being automatically received by the upper cylinder needles during the knitting of the spaced rib knit courses to incorporate correspondingly spaced rounds of elastic thread in said top portion without the necessity of withdrawing the elastic feed finger at any time or of altering the cams which manipulate the sliders to draw the elastic thread from the feed finger. The spacing of successive rounds of elastic thread in the top portion of the sock thus follows automatically from the knitting of spaced rib knit courses. It will be understood that during the knitting of the top portion, the selector levers of the other set namely selector levers in position numbers 1 to 10 are held out of operation by blocking bar 109 (Fig. 7 and Fig. 9) and hence in no way disturb or interfere with the actuation of the selectors by the selector levers in positions numbers 11 and 12.

Upon completion of the top portion of the sock, the elastic feed finger is moved to inoperative position and the elastic thread is cut and bound. Upper shunt cam 85 is withdrawn allowing the knitting butts of the upper cylinder sliders to be by-passed through race-way 84. Lower shunt cam 54 is moved to operative position and draw down cam 73 is withdrawn, whereby the knitting butts of the lower cylinder sliders after leaving the main stitch cam 49 will ride up the face of main clearing cam 52 and pass above stitch cam 74 at the second feeding station. Selector levers at number 14 and number 12 positions are blocked out of operation by bar 110 (Figs. 8 and 9), and blocking bar 109 is swung in a counterclockwise direction from the position shown in Fig. 7 to release the upper ten selector levers. These levers will thereupon be moved into and out of operative position in predetermined sequence by projections provided on pattern drum 104 to control the transfer of needles from one cylinder to the other in the manner required to produce the desired pattern. For example, in knitting course C13 in Fig. 21, the needles forming the wales W1, W4 and W5, will be in the lower cylinder, while the needles forming the wales W2, W3, W6 and W7, will be in the upper cylinder. In knitting course C17, the needles producing wales W1 to W5 will be in the lower cylinder, while the needles producing wales W6 and W7 will be in the upper cylinder. The Links-Links pattern of the leg portion of the sock is thus produced by transferring needles from one cylinder to the other at the proper time. It will be understood that in producing Links-Links fabric, the lower transfer cam 76 is in operative position to transfer all of the needles to the upper cylinder, at each revolution of the needle cylinder whereupon selected needles are retransferred to the lower cylinder by action of the selectors, the needle transfer being dependent upon the arrangement of selector butts on the selectors and the arrangements of projections on pattern drum 104 controlling the selector levers. During the knitting of the Links-Links fabric of the leg portion, selector levers 11 and 12 are maintained out of operation by blocking bar 110 so that they in no way interfere with the actuation of the selectors by the selector levers of the other set. Following completion of the leg portion, the foot of the sock, with suitable heel and toe pockets may be knit in usual manner.

It will be noted that the sock shown in Figs. 18 to 21 involves the knitting of 1 x 1 rib courses in the production of the selvage, rib courses of a broader rib pattern, for example 1 x 3 separated by plain courses in the top portion T and Links-Links fabric in the leg L. In Figs. 22 and 23 there is shown a slightly different embodiment of the invention requiring the production of 1 x 1 rib courses for the selvage, broader rib courses, for example 2 x 2 for the top, and a Links-Links leg. It has not heretofore been possible to produce a sock having this combination of stitch structures. If the lower transfer cam is used to obtain the 1 x 1 needle selection for the selvage, it cannot also be used for the 2 x 2 rib leg, as certain of the transfer butts which would have to be long for one selection, would have to be short for the other. The upper transfer cam is not available for the second selection as it must be used for transferring all the needles around approximately one-half of the needle cylinder to the lower cylinder to produce a plain knit sole when knitting the foot. Moreover, the mechanism ordinarily used for producing Links-Links fabric cannot be employed for both the 2 x 2 rib top and the Links-Links leg, as the pattern of the top would be repeated in the leg.

Figure 26:
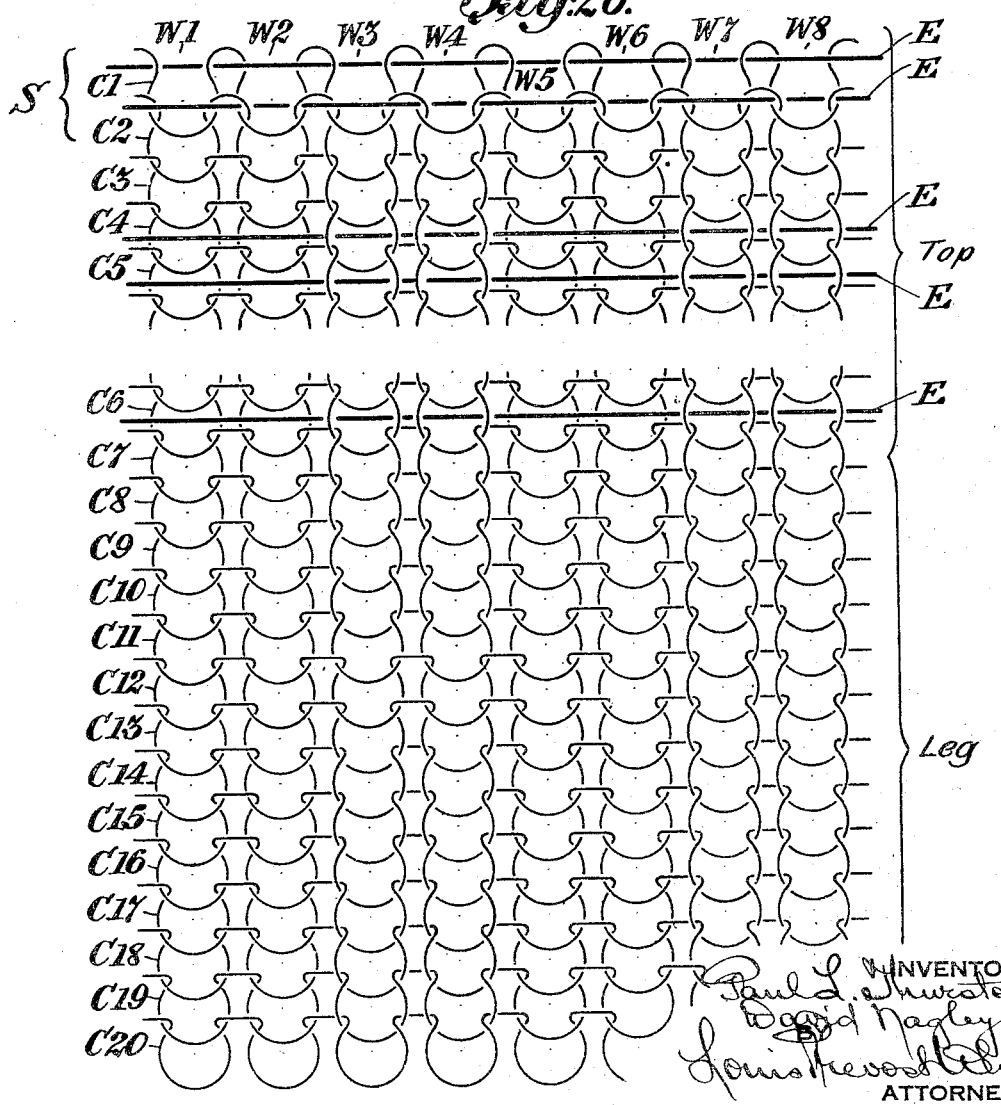
Fig. 26 shows diagrammatically the fabric structure of the sock shown in Fig. 22.

The manner in which the sock of Figs. 22 and 23 is produced in accordance with the invention is illustrated in Fig. 15 in conjunction with Fig. 26 which shows the stitch structure. The selectors are not shown in Fig. 15, but will be the same as in Fig. 10, except that the selectors are arranged to provide pairs having selector butts at number 12 position, alternating with pairs having selector butts at number 11 position, thereby providing for a 2 x 2 needle selection instead of a 1 x 3 needle selection as in Fig. 10. The socks of Fig. 22 and Fig. 23 are preferably produced by string work, and the ravel draw thread and selvage courses may be formed in the manner described above in connection with Figs. 10 to 14 and 18 to 21. Following the knitting of selvage course C1 (Fig. 26), the blocking bar 110 controlling the selector levers at number 11 and number 12 positions (Figs. 8 and 9) is swung in a counterclockwise direction to free said selector levers and the projections on pattern drum 104 are so arranged as to permit number 11 and 12 selector levers to move into operative position to transfer all of the needles to the lower cylinder and produce a plain knit course C2 (Fig. 26). It will be seen that the knitting of this plain knit course completes the tying in of the second round of elastic thread E, in the selvage in the same manner as described above. One or more additional plain knit courses may be knit, if desired. Thereupon, the selector lever at either number 11 or number 12 position is swung out of operation by the provision of suitable projections on pattern drum 104 which is now being racked one step forward each revolution of the needle cylinder. This permits alternate pairs of needles to remain in the upper cylinder to produce the 2 x 2 rib fabric of the top. After the 2 x 2 needle selection has been obtained, the pattern drum 104 may, if desired, be stopped. In the same manner as described in connection with Figs. 10 to 14, a fabric thread is fed at the main feeding station to the needles located in both cylinders, whereas an elastic thread is fed to upper cylinder needles only at the second feeding station. The stitch cam 92 raises the upper cylinder needles at the second feed to draw loops of the elastic thread, thereby withdrawing a measured amount of the elastic thread from the feed finger. In Fig. 15 the descending cam 82 is shown as being cut off so that the upper cylinder needles are not lowered to clearing position after drawing stitches at the main feeding station. Hence the stitches of fabric thread will be retained in the hooks of the upper cylinder needles and will not be cast off when the needles are drawn up by stitch cam 92. After passing the second feeding station the upper cylinder needles are moved downwardly to clearing position by clearing cam 93, placing both the elastic thread received at the second feeding station and the fabric thread received at the main feeding station behind, i. e., above the latches of the needles. When the needles again reach the main feeding station, they draw new loops of fabric thread, casting off the previously drawn loops and dumping the elastic thread onto the web formed by the fact that alternate pairs of stitches of fabric thread are drawn upwardly by the upper cylinder needles, while intervening pairs of stitches are drawn downwardly by the lower cylinder needles. The elastic thread thus lies between the upper cylinder stitches and the lower cylinder stitches and on the succeeding revolution of the machine when the upper and lower cylinder stitches are united by the next course of fabric thread, the elastic thread will be held in between the inwardly facing stitches and the outwardly facing stitches of the fabric as shown in course C4 in Fig. 26. It will be seen that the elastic thread fed to the upper cylinder needles during the knitting of one course of fabric thread is not incorporated in the fabric until the next succeeding course of fabric thread, the elastic thread appearing in course C4 of Fig. 26, having been fed to the upper cylinder needles during the knitting of course C3. As in the previously described embodiment, the lower cylinder needles are by-passed at the second feeding station so that they do not receive the elastic thread.

When the required number of 2 x 2 rib courses for a top portion of the required length have been produced, the feeding of elastic thread is discontinued and lower shunt cam 54 is moved into operative position, while draw down cam 73 and upper shunt cam 85 are taken out. The racking of pattern drum 104 is resumed in the event it has been interrupted and blocking bar 110 (Figs. 8 and 9) is swung in a clockwise direction to the position shown in Fig. 8 to maintain number 11 and 12 selector levers in inoperative position, while blocking bar 109 (Figs. 7 and 9) is swung in a counterclockwise direction to release the selector levers of the other set. The latter set of selector levers is thereupon employed to produce the Links-Links pattern of the leg portion as in the embodiment described above. It will be noted that since the selector levers employed in knitting the 2 x 2 top portion are held in inoperative position by blocking bar 110 during the knitting of the leg, they cannot interfere with the Links-Links pattern of the leg portion. Instead of continuing the feeding of elastic thread throughout the knitting of the top portion of the sock, the elastic thread feed may be withdrawn immediately after completion of the selvage so that the elastic thread occurs in the selvage courses only as illustrated in Fig. 24 or it may be discontinued at any point during the knitting of the top, as desired. In the embodiment shown in Figs. 27 and 28, the position of the rib knit fabric and Links-Links fabric is reversed, the top portion of the sock being formed of Links-Links fabric, while the leg portion is composed of rib knitting with continuous vertical ribs. The article may be produced by string work as heretofore described, and the same sequence of ravel, draw thread and selvage courses may be used. In the completed top, the structure of the selvage may be the same as in Figs. 22 and 23, and elastic thread may be incorporated in the top portion in like manner by lying between the inwardly facing stitches and the outwardly facing stitches of the fabric. Alternatively, the elastic thread may be interknit with selected stitches of the fabric thread and it is this latter form of the invention which will now be described.

Figure 25:
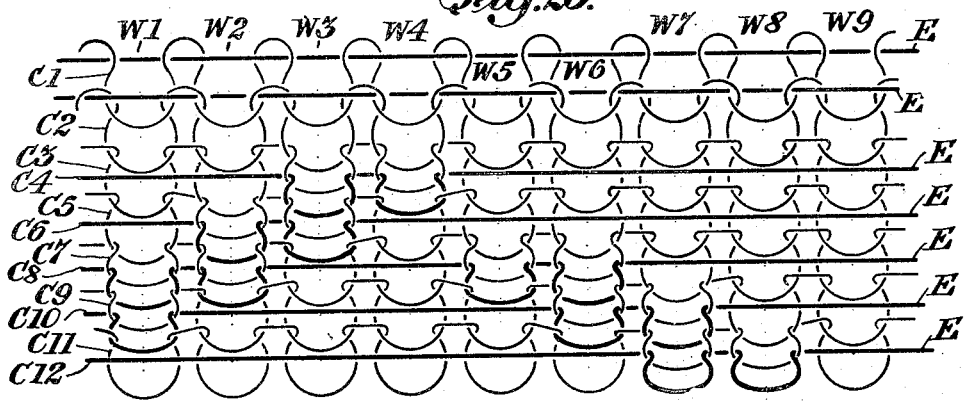
Fig. 25 shows diagrammatically a section of the fabric forming the top portion of the sock of Fig. 27.

Referring to Fig. 25 which shows the stitch structure of the fabric, it will be seen that in selvage course C1 the loops of fabric thread are drawn alternately on opposite sides of an elastic thread extending coursewise through the selvage. Keeping in mind that Fig. 25 shows the inside of the fabric, it will be seen that in the odd numbered wales of course C1 the loops of fabric thread are drawn inside the elastic thread E, while in the even numbered wales, the loops of fabric thread are drawn outside the elastic thread. A second selvage course C2 shown as a plain knit course, may be provided to form a stronger selvage, it being noted that the second round of elastic thread E is held between alternate needle loops of course C1 and the adjacent sinker loops of course C2. Course C3 is formed of fabric thread, and is composed of outwardly facing stitches at wales W1, W2 and W5 to W9, and inwardly facing stitches at wales W3 and W4. Course C4 which is, in effect, only a partial course is formed of elastic thread E which is interknit with the fabric thread at inwardly facing stitches in wales W3 and W4, and is floated behind outwardly facing stitches of fabric thread in wales W1, W2 and W5 to W9. Course C5 is formed of fabric thread which is interknit with the loops of elastic thread drawn at wales W3 and W4 and is elsewhere interknit with loops of the preceding course C3 of fabric thread. The course C5 is composed of inwardly facing stitches at wales W2 and W3 and outwardly facing stitches at wales W1 and W4 to W9. Course C6 is formed of elastic thread interknit with loops of the preceding course of fabric thread at inwardly facing stitches in wales W2 and W3, and floated behind outwardly facing stitches of the fabric thread at wales W1 and W4 to W9. The fabric is continued in like manner to form a top portion of the desired length, the arrangement of the inwardly facing stitches and outwardly facing stitches being such as to form a Links-Links fabric which is shown in Figs. 25, 27 and 28 as a diagonal pattern. It will be noted that the outwardly facing stitches of fabric thread behind which the elastic thread is floated are of approximately twice the length of the inwardly facing stitches which are interlooped with stitches of elastic thread. As the elastic thread appears at the front face of the fabric, only at those wales where it is knitted an attractive design effect may be obtained by using elastic and fabric threads of different colors. If, for example, a black fabric thread and a white elastic thread are used, the portions of the fabric at which the elastic thread is knit will have alternate courses formed of the white elastic thread and intervening courses formed of the black fabric thread, thus producing a single course stripe having the appearance of a black and white mixture, while at those portions where the elastic thread is floated, the face of the fabric is formed solely of the fabric thread, and is hence solid black. A distinctive solid color design is thus produced. The design effect is heightened by the fact that the portions composed of both threads are formed of inwardly facing stitches, while the solid color portions composed of one thread only are formed of outwardly facing stitches causing them to stand out in relief. The fact that the outwardly facing stitches of the solid color portions are approximately twice the length of the inwardly facing stitches adds still further to the design effect obtained. As the design effect depends upon contrast of stitch structure rather than upon any gathering effect of the elastic thread, both threads may be relatively inelastic fabric thread, or one or both may be elastic. Where the fabric forms the top part of the sock as in Fig. 27, elastic thread is preferably used to give the desired stretch and elasticity. The leg portion of the sock may be formed of rib knit fabric with continuous vertical ribs, as shown, or with a Links-Links pattern.

Figure 16:
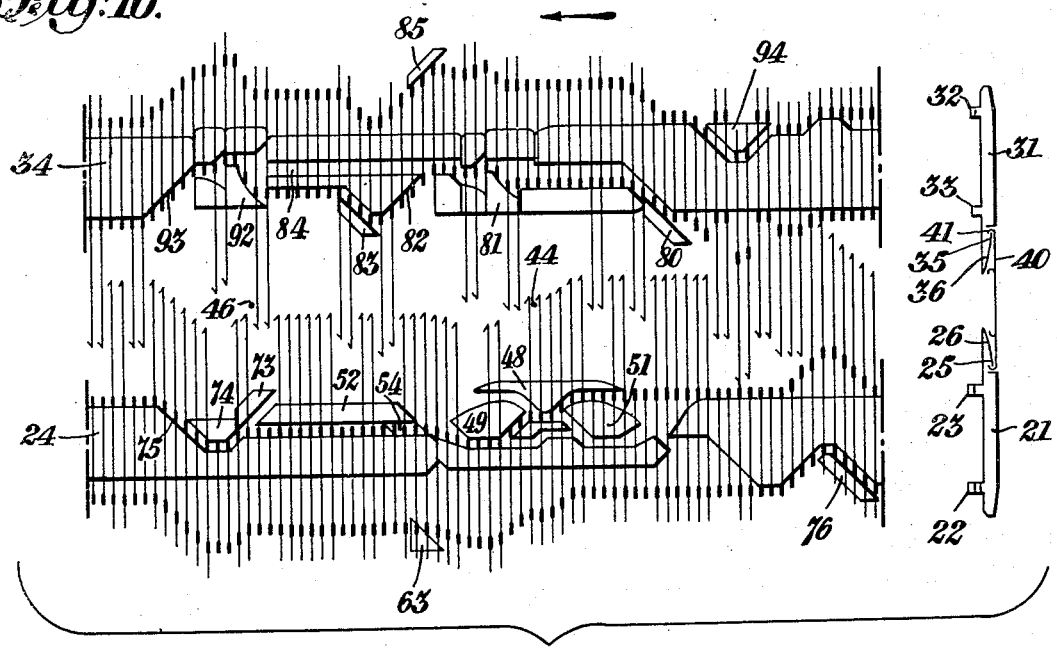
Fig. 16 is a view similar to Fig. 10 showing the incorporatoin of elastic thread in Links-Links fabric to form the top portion of the sock shown in Figs. 25, 27 and 28.

The method of making the sock shown in Figs. 27 and 28 is illustrated in Fig. 16 in conjunction with Fig. 25. The selectors and selector levers are not shown in Fig. 16, as it will be understood that the selector butts and the projections on pattern drum 104 will be arranged to give the pattern desired. One set of selector levers may be used for the Links-Links fabric of the top portion and another set used for the rib knit fabric of the leg portion. As a Links-Links pattern requires more selector levers than rib knitting with continuous vertical ribs, the upper ten selector levers may, in the example shown be used for the top and the lower two for the leg. The socks may be produced by string work and the ravel, draw thread and selvage courses may be knit as described in conjunction with Fig. 10 to Fig. 14. Upon completion of the selvage the upper blocking bar 109 is swung in a counterclockwise direction, thereby freeing the upper set of selector levers and permitting movement of the levers into and out of operation by the projections on pattern drum 104 in predetermined sequence to produce the Links-Links fabric of the top portion, it being understood that where an inwardly facing stitch is to be produced, the corresponding needle is positioned in the upper cylinder and that where an outwardly facing stitch is desired, the corresponding needle is transferred to the lower cylinder. At the main feeding station, a fabric thread is fed to the needles in both cylinders, while at the second feeding station a second thread which, in the present example, is an elastic thread, is fed to the upper cylinder needles only. The lower shunt cam 54 is withdrawn allowing the knitting butts of the lower cylinder sliders to pass through raceway 53 thereby by-passing the lower cylinder needles at too low a level to receive the thread fed at the second thread feed. The upper shunt cam 85 is in operative position, causing the knitting butts of the upper cylinder sliders to ride down the face of descending cam 82 and up cam 83 to position the needles to receive the thread at the second feed. The needles are then raised by upper stitch cam 92 to draw stitches of the second thread. It will be noted that descending cam 82 and stitch cam 92 are of such height that the stitches of fabric thread drawn by the upper cylinder needles at the main feeding station are placed behind, i. e., above the latches at cam 82 and are cast off at cam 92 whereby a stitch of the thread fed at the second feeding station is drawn through a stitch of the thread fed at the main feeding station. As the needles of the upper cylinder receive and knit both the thread fed at the main feeding station and the thread fed at the second feeding station, whereas the needles of the lower cylinder receive and knit only the thread fed at the main feeding station, the upper cylinder needles produce two courses of stitches to each course of stitches produced by the lower cylinder needles. To compensate for this and to prevent distortion of the fabric, the lower stitch cam 49 at the main feeding station is adjusted downwardly to cause the needles in the lower cylinder to draw stitches that are approximately twice as long as those drawn by the upper cylinder needles. Referring, for example, to course C3 in Fig. 25, it will be seen that the outwardly facing stitches in wales W1 and W2 produced by lower cylinder needles are approximately twice the length of inwardly facing stitches in wales W3 and W4 produced by upper cylinder needles and approximately equals the combined length of the stitches drawn by the upper cylinder needles at the main feeding station and the stitches drawn by the same needles at the second feeding station.

Upon completion of the Links-Links top portion of the sock shown in Fig. 27, the blocking bar 109 in Figs. 7 and 9 is swung in a clockwise direction to the position shown in Fig. 7 to maintain selected levers of the upper set in inoperative position and the selected levers of the lower set are released by blocking bar 110 (Figs. 8 and 9) and engage suitable selector butts of the selectors to transfer the proper needles to the lower cylinder to produce the rib knit leg portion. For example, groups of six needles may be transferred to the lower cylinder leaving groups of three needles in the upper cylinder to produce a 6 x 3 rib leg. Alternatively, the leg portion of the sock may be formed of Links-Links fabric and the pattern may be different from that of the top. In this event the division between the two sets of selector levers would preferably be different, there being for example, six selector levers in each set. Whether the leg portion of the sock is of Links-Links fabric or straight rib, it may be produced more rapidly as two-feed work by feeding a second thread at the secondary feeding station and positioning upper shunt cam 85, lower shunt cam 54 and the draw down cam 73 at the second feeding station all in operative position so that the needles in both cylinders will receive and knit the thread fed at each feeding station. The foot portion of the sock may be produced in usual manner.

Figure 31:
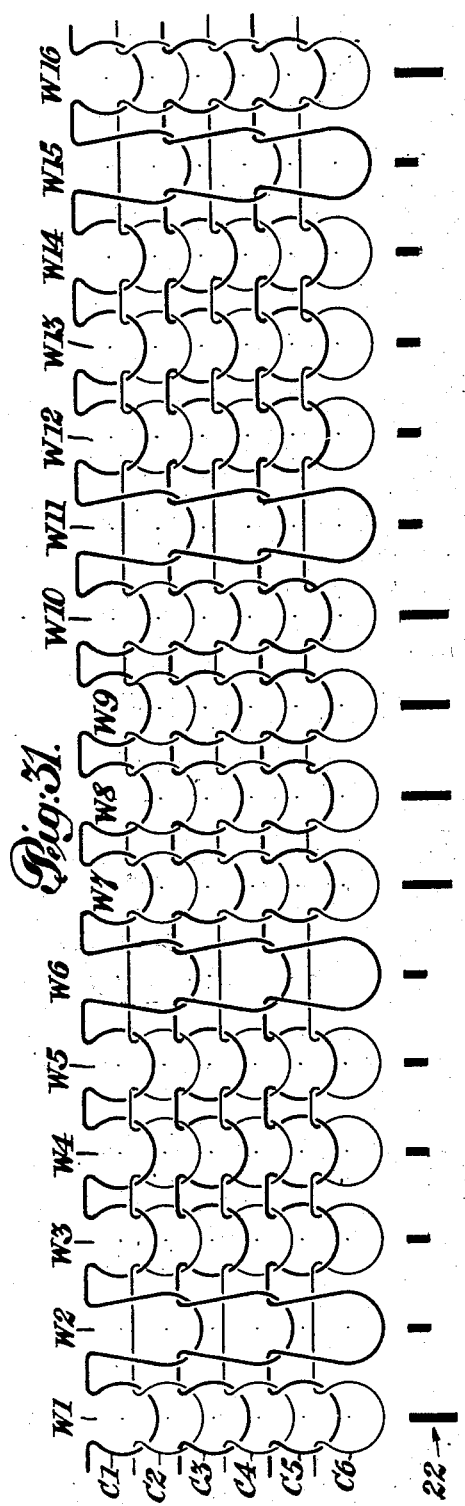
Fig. 31 shows diagrammatically the stitch structure of the fabric of Fig. 29 and includes at the bottom of the figure a representation of the relative lengths of the lower transfer butts employed in producing this fabric.

A further embodiment of fabric in accordance with the invention is illustrated digrammatically in Fig. 29 which shows the outer face of the fabric and in which outwardly facing stitches are represented by V's having their points downward, and inwardly facing stitches are represented by inverted V's having their points up. Stitches of greater length are represented by longer V's. The stitch structure of the fabric of Fig. 29 is illustrated in Fig. 31, which unlike the preceding figures represents the outside of the fabric. While the fabric could be produced of a single thread by knitting alternate courses in different manner, it is preferably produced as a multi-feed fabric with alternate courses formed of different threads which may be of the same or different color or character. Thus, the odd numbered courses may be formed of one thread and the even numbered courses of another thread. A characteristic of the fabric is that courses composed of inwardly facing stitches and outwardly facing stitches of thread alternate with other courses of a thread knit at inwardly facing stitches and floated behind at least certain of the outwardly facing stitches of the first mentioned courses. In the fabric shown by way of example in Figs. 29 and 31, the odd numbered courses are composed of thread forming outwardly facing stitches at wales W1, W2, W6 to W11, W15 and W16, and inwardly facing stitches at wales W3 to W5 and W12 to W14. The intervening even numbered courses are composed of thread knit to form inwardly facing stitches at wales W3 to W5 and W12 to W14 and is floated behind all or certain of the outwardly facing stitches being illustrated as being floated behind outwardly facing stitches at wales W2, W6, W11 and W15 and knit at outwardly facing stitches at wales W1, W7 to W10 and W16. The number and arrangement of outwardly facing stitches in the odd numbered courses and the number of outwardly facing stitches behind which the thread of the even numbered courses is floated may be varied as desired to form different designs. Long floats should in general be avoided unless formed of elastic thread, as they will limit the extensibility of the fabric. If this precaution is observed the fabric produced has excellent properties of extensibility and recoverability by reason of the stitch structure.

While the structure of the fabric will in itself provide a visible pattern, a more striking design can be obtained by using threads of different character or different color. For example, if odd numbered courses are formed of brown yarn and even numbered courses of green yarn, it will be seen that in areas formed by wales W1, W3 to W5, W7 to W10, W12 to W14 and W16, alternate courses will be composed of brown yarn and intervening courses of green yarn, giving a single course horizontal stripe having the appearance a short distance away from the fabric of a brown and green mixture. The areas composed of wales W2, W6, W11 and W15 are formed of outwardly facing stitches of brown thread only, the green thread being floated behind these stitches and will hence be solid brown in color. An attractive solid color design on a mixed color background is thereby produced. The distinctive appearance of the design is enhanced by the fact that the outwardly facing stitches forming the solid color portions are of approximately twice the length of the remaining stitches. The solid color design may be made to stand out still more boldly in relief by providing inwardly facing stitches on each side.

Figure 17:
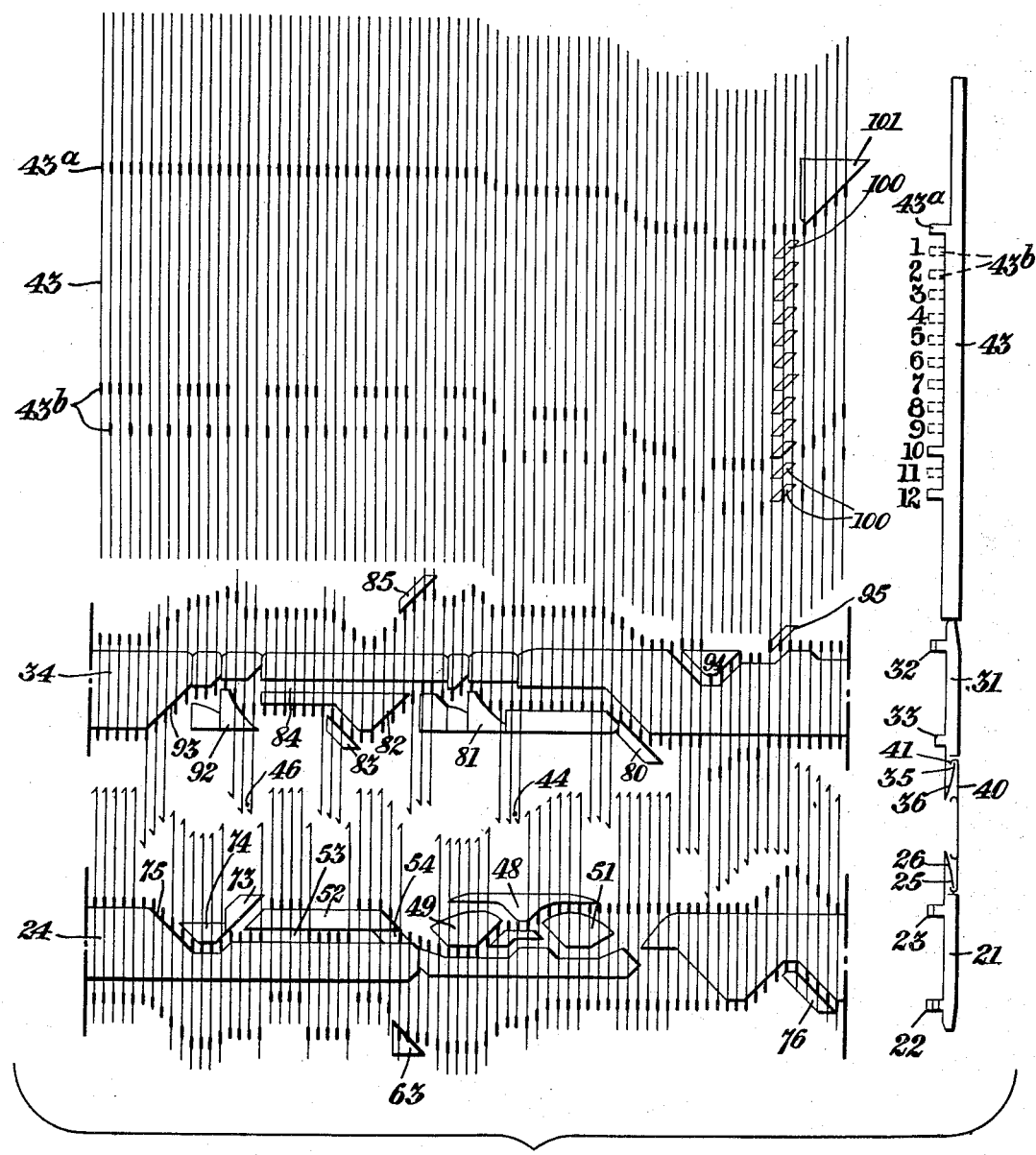
Fig. 17 is a view similar to Fig. 10 showing the formation of the fabric of Figs. 29 and 31.

The method of making the fabric of Fig. 29 is illustrated in Fig. 17 in conjunction with Fig. 31, showing stitch structure. Assuming for example that the fabric is to be used in the leg portion of a sock having a 1 x 1 rib knit top, the 1 x 1 needle selection for the top may be obtained by the number 12 selector lever acting on selector butts provided on alternate selectors at the number 12 level as illustrated in Fig. 17. Thread may be fed at both feeding stations in order to produce the top more rapidly. Upon completion of the top portion, the number 12 selector lever is blocked out of operation by bar 110 (Fig. 8 and Fig. 9) and the levers of another set are released by bar 109. The projections on pattern drum 104 are so arranged as to permit one of the levers for example, number 10 lever, to swing into operative position to engage selector butts at number 10 level which are arranged to transfer groups of six needles to the lower cylinder, leaving groups of three needles in the upper cylinder. In forming the fabric of Fig. 29, upper shunt cam 85 is in operative position, whereby upper cylinder needles are moved downwardly by descending cam 82 to clearing position and are then positioned by cam 83 to receive thread fed at the second feeding station. Lower shunt cam 54 is in inoperative position, whereby the knitting butts of the lower sliders may be by-passed through race-way 53. However, the passage of knitting butts through this race-way is controlled by selecting cam 63 which is in operative position and is adapted to engage long transfer butts provided on selected ones of the lower cylinder sliders to raise said sliders sufficiently that their knitting butts will ride up the face of clearing cam 52, thereby raising the respective needles to clearing position. Other sliders having shorter transfer butts will not be raised by selecting cam 63 and their knitting butts will pass through race-way 53. The needles which are raised by selecting cam 63 and clearing cam 52 to clearing position will take the thread fed at the second feeding station while the needles corresponding to sliders, the knitting butts of which are by-passed through race-way 53 past the feeding station at too low a level to receive the second thread, and retain their stitches of the thread received and knit at the main feeding station. Thus, in the group of six lower cylinder needles shown approaching the second feeding station in Fig. 17, it will be seen that the first and last needles of the group will be by-passed below the feed finger and will not receive the second thread while the four central needles of the group have been raised to clearing position by selecting cam 63 and clearing cam 52 and will receive the thread fed at the second feeding station. It will be observed that draw down cam 73 is in operative position so that the needles that have been raised will be drawn down by cam 73 and stitch cam 74 to draw stitches of the second thread and cast off the previously drawn stitches of the thread knit at the main feeding station. Thus in the example shown, the thread fed at the main feeding station is received and knit by needles in both cylinders while the thread fed at the second feeding station is received and knit by upper cylinder needles and certain lower cylinder needles while other lower cylinder needles are by-passed so that they do not receive the second thread.

The arrangement of the transfer butts of the lower cylinder sliders is shown at the bottom of Fig. 3 in order to associate the long and short butts with the stitches formed by the respective needles. The slider corresponding to lower cylinder needles producing the outwardly facing stitches of wales W1, W7 to W10 and W16, have long transfer butts whereby these needles will be raised by selecting cam 63 and will receive and knit both the thread fed at the main feeding station and that fed at the second feeding station. Sliders corresponding to the lower cylinder needles producing the outwardly facing stitches of wales W2, W6, W11 and W15, have short transfer butts whereby these needles will miss the thread fed at the second feeding station and will receive and knit only the thread fed at the main feeding station. The length of transfer butts on sliders corresponding to the needles producing wales W3 to W5 and W12 to W14 is not important, as these needles are in the upper cylinder, but the butts are shown as being short in order to keep the sliders down out of the way. By merely re-arranging the transfer butts of the lower cylinder sliders, any of the needles in the lower cylinder may be caused to knit the first thread only and miss the second thread, thereby producing solid color design portions in the fabric. While the transfer butts are shown in Fig. 31 as being of only two lengths, the sliders on approximately one-half of the lower needle cylinder have medium length instead of short length butts so that in knitting the foot of a sock the selecting cam 63 may be moved inwardly to engage both the long and the medium butts to cause all of the needles knitting the sole to take both threads while the needle selection is continued in the instep portion. Other lengths and arrangements of transfer butts may be provided as desired in order to obtain different design patterns by moving the selecting cam 63 inwardly or outwardly to engage the transfer butts of more or fewer of the sliders.

Figure 32:
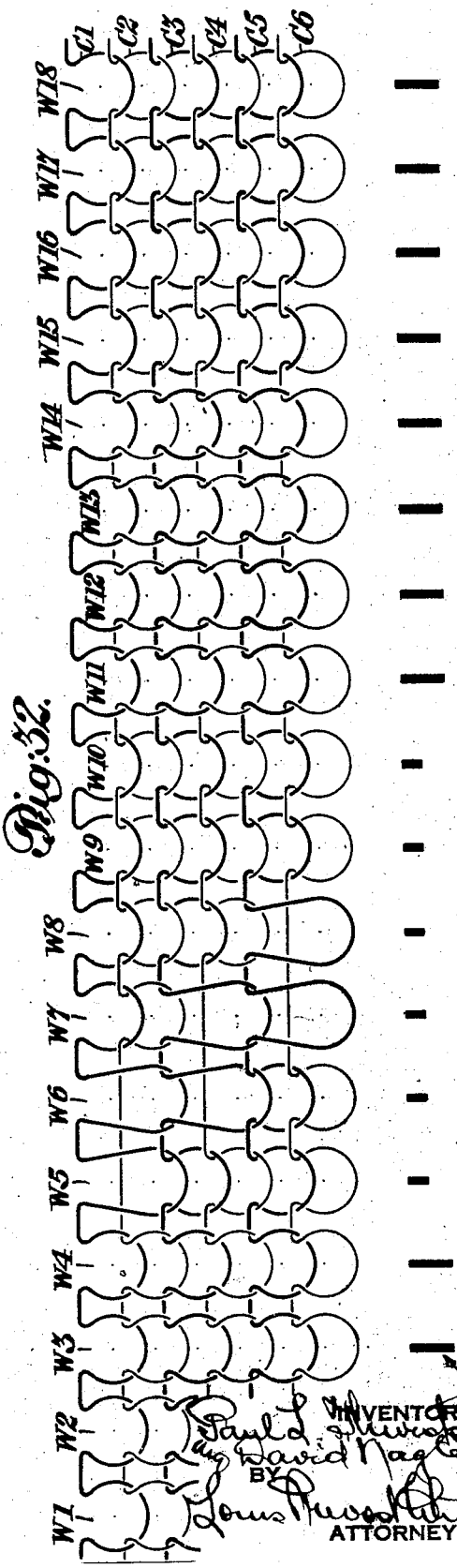
Fig. 32 is a view similar to Fig. 31 showing the stitch structure of the fabric of Fig. 30.

A slightly different form of fabric is shown in Figs. 30 and 32. In these figures, the outwardly facing stitches forming the solid color design portions of the fabric are arranged to produce a design extending diagonally instead of vertically of the fabric. In Fig. 32 it will be seen that spaced courses shown as odd numbered courses of the fabric are composed of inwardly facing stitches and outwardly facing stitches alternately disposed, singly or in groups around the fabric and that thread forming intervening courses, i. e., the even numbered courses is knit at inwardly facing stitches and is floated behind at least certain outwardly facing stitches of the odd numbered courses. In course C2 the second thread is floated behind the stitches of wales W5 and W6, in course C4 behind the stitches of wales W6 and W7 and in course C6 behind stitches of wales W7 and W8, thereby forming a diagonal design. Designs of other conformations may be produced as desired by different arrangements of the outwardly facing stitches behind which the second thread is floated. It will be noted that in the portions of fabric comprising wales W5 and W6 in courses C1 and C2, wales W6 and W7 in courses C3 and C4, and wales W7 and W8 in courses C5 and C6, the face of the fabric is composed entirely of one thread only, giving a solid color design while in adjacent portions of the fabric, alternate courses are formed of different threads producing single course, horizontal stripes giving a mixed color effect where threads of two colors are used. There is thus produced a solid color design on a mixed color background. Moreover, the solid color design is made to stand out in relief by reason of the fact that it is produced of outwardly facing stitches while adjacent portions of the fabric are composed of inwardly facing stitches.

The fabric of Fig. 30 is produced in substantially the same manner as that of Fig. 29, except that certain of the needles are transferred from one cylinder to the other during the knitting of the fabric to produce a Links-Links pattern instead of remaining in one cylinder or the other to produce the continuous vertical rib fabric of Fig. 29. It will be understood that the transfer of needles may be effected by the selectors and selector levers, the butts on the selectors and the projections on pattern drum 104 controlling the selector levers being arranged to transfer needles to give the Links-Links pattern desired. Referring to Fig. 32 where the relative lengths of transfer butts on lower cylinder sliders are illustrated at the bottom of the figure, it will be seen that the group of sliders corresponding to the needles producing wales W5 to W10, all have short transfer butts. These sliders will accordingly not be raised by selecting cam 63 and any corresponding needles in the lower cylinder will consequently be by-passed at the second feeding station whereby they receive and knit thread at the main feeding station only and do not receive the second thread. When any of the needles of this group are in the upper needle cylinder, they will receive and knit both the thread fed at the main feeding station and the thread fed at the second feeding station. Thus, the needles of the group producing wales W5 to W10 of Fig. 32 knit both threads when in the upper cylinder, but knit one thread only when in the lower cylinder. The design effect is obtained by transferring needles from one cylinder to the other. It will be understood that when the needles are in the upper cylinder, they knit inwardly facing stitches, and that when they are in the lower cylinder they knit outwardly facing stitches so that the design produced by the outwardly facing stitches is not only of different color, assuming that threads of different color are being used, but will also stand out in relief from the background formed of inwardly facing stitches.

In producing courses C1 and C2 of the fabric shown in Fig. 32, two courses being knit each revolution of the machine, the needles corresponding to wales W1 to W6 and W11 to W14 are in the lower cylinder and will produce outwardly facing stitches, while the needles corresponding to wales W7 to W10 and W15 to W18 are in the upper cylinder and will produce inwardly facing stitches. Lower cylinder sliders corresponding to the needles producing wales W1 to W4 and W11 to W14 have long transfer butts so that these needles will be raised by selecting cam 63 and will knit the thread fed at the second feeding station as well as that fed at the main feeding station. Sliders corresponding to the needles producing wales W5 and W6 have short transfer butts so that these needles miss the thread fed at the second feeding station and retain the stitches drawn at the main feeding station. The lower cylinder sliders corresponding to the needles producing wales W7 to W10 also have short transfer butts, but as these needles are for the moment in the upper cylinder, they will receive and knit both threads. In the next revolution of the machine, producing courses C3 and C4, the arrangement and operation is the same except that the needle producing wale W5 has now been transferred to the upper cylinder where it will knit inwardly facing stitches of both threads, while the needle producing wale W7 has been transferred to the lower cylinder where it will knit an outwardly facing stitch of one thread only since the corresponding slider has a short transfer butt. The following revolution, produces courses C5 and C6, the needle producing wale W6 being in the upper cylinder where it will knit successive inwardly facing stitches of both threads, while the needle producing wale W8 has been transferred to the lower cylinder where it will receive and knit the thread fed at the main feeding station, but will knit the thread fed at the second feeding station by reason of the short transfer butts, the second thread being floated behind the outwardly facing stitch drawn at the main feeding station.

It will be seen that in wales W5, W6 of courses C1 and C2, wales W6 and W7 in courses C3 and C4, and in wales W7 and W8 in courses C5 and C6, the fabric is formed of outwardly facing stitches knit entirely of the thread fed at the main feeding station while in adjacent portions of the fabric stitches knit at the main feeding station alternate with stitches knit at the second feeding station. Hence, when threads of different color are fed at the two stations, the first mentioned portion of fabric will be of solid color, namely the color fed at the main feeding station, while in the latter portion of the fabric, stitches of one color will alternate with stitches of another color. As the shape and extent of the solid color design portion is controlled by positioning the needles in one cylinder or the other, and by the arrangement of transfer butts of different lengths, on corresponding lower cylinder sliders, a wide variety of designs may be produced. It will be understood that the invention is not limited to the particular design shown by way of example in the drawings, but extends to all designs within the scope of the following claims.

What we claim and desire to secure by Letters Patent is:

1. The method of producing tubular fabric on a knitting machine having coaxial superposed cylinders, which comprises feeding elastic thread to upper cylinder needles at a secondary feeding station, by-passing the lower cylinder needles at said feeding station to prevent their taking the elastic thread, manipulating the upper cylinder needles to draw loops of the elastic thread, feeding fabric thread to needles of both cylinders at a main feeding station, and manipulating the needles to knit said fabric thread.

2. In the knitting of tubular fabric on a circular knitting machine having coaxial superposed cylinders, the method of producing a design which comprises knitting thread on the needles of both cylinders at a main knitting station, knitting a second thread on the upper cylinder needles only at a secondary knitting station, and floating the second thread behind intervening stitches formed on the lower cylinder needles.

3. The method of producing tubular fabric on a knitting machine having coaxial superposed cylinders, which comprises assembling all of the needles in one cylinder at one point in each revolution of the machine, transferring certain needles to the other cylinder in advance of a main knitting station, knitting thread on the needles of both cylinders at said station, knitting a second thread on the upper cylinder needles only at a secondary knitting station, and floating the second thread across intervening stitches formed on the lower cylinder needles.

4. The method of producing tubular fabric on a knitting machine having coaxial superposed cylinders, which comprises knitting fabric thread on the needles of both cylinders at a main thread feeding station, feeding elastic thread to upper cylinder needles only at a secondary feeding station, manipulating the upper cylinder needles to draw loops of the elastic thread while retaining the previously drawn loops of fabric thread, and again knitting fabric thread on the needles of both cylinders at the main feeding station to tie in the elastic thread.

5. In a method of producing tubular fabric on a knitting machine having coaxial superposed cylinders, the steps of positioning spaced needles in the upper cylinder and intervening needles in the lower cylinder, feeding elastic thread to the upper cylinder needles only, transferring said needles to the lower cylinder and feeding fabric thread to all of the needles.

6. In a method of producing tubular fabric on a knitting machine having coaxial superposed cylinders, the steps of transferring spaced needles to the upper cylinder, feeding fabric thread to both upper and lower cylinder needles, and manipulating the needles to draw stitches, feeding elastic thread to the upper cylinder needles only, transferring said needles to the lower cylinder while retaining the elastic thread, and feeding fabric thread to all of the needles.

7. In a method of producing tubular fabric on a knitting machine having coaxial superposed cylinders, the steps of positioning certain needles in the upper cylinder and intervening needles in the lower cylinder, feeding a thread to upper cylinder needles and manipulating the needles to draw stitches, while by-passing at least certain of the lower cylinder needles to prevent their taking the said thread, feeding a second thread to needles in both upper and lower cylinders and manipulating the needles to draw stitches of said second thread.

8. In the method of producing tubular fabric on a knitting machine having coaxial superposed cylinders, the steps of positioning certain needles in the upper cylinder and intervening needles in the lower cylinder, feeding a thread to both upper and lower cylinder needles, manipulating the needles to draw stitches, feeding a second thread to the upper cylinder needles and selected ones of the lower cylinder needles while by-passing the remaining lower cylinder needles to prevent their taking said second thread, and manipulating the needles to draw stitches of said second thread.

9. In a method of producing tubular fabric on a knitting machine having coaxial superposed cylinders, the steps of transferring all the needles to one cylinder during each revolution of the machine, retransferring different ones of selected groups of needles to the other cylinder during each of successive revolutions, feeding at least two threads to the needles at different points around the needle cylinders, and manipulating needles of said selected groups to take both of said threads when in the upper cylinder and to take one of said threads only when in the lower cylinder.

10. In a method of producing tubular fabric on a knitting machine having coaxial superposed cylinders, the steps of positioning selected needles in the lower cylinder and the remainder in the upper cylinder, feeding a thread to the upper cylinder needles, manipulating the upper cylinder needles to form loops of said thread to draw a measured amount of thread from the thread feed, lowering the upper cylinder needles to relax said loops, feeding a second thread to upper cylinder needles and lower cylinder needles and manipulating the needles to draw stitches of said thread and tie in the first mentioned thread.

11. In a method of producing hosiery on a circular knitting machine having coaxial superposed cylinders, the steps of feeding thread to all the needles and manipulating the needles to knit a plurality of ravel courses, positioning alternate needles in the upper cylinder, feeding a fabric thread to all the needles at one feeding station, and feeding a draw thread to the needles of one cylinder only at a second feeding station, discontinuing the feeding of draw thread and feeding an elastic thread to the upper cylinder needles only for at least one complete revolution while continuing the feed of fabric thread to all the needles, manipulating the needles to draw loops of fabric thread alternately on opposite sides of the elastic thread, transferring all the needles to the lower cylinder and knitting one or more rounds of plain knit fabric, periodically transferring spaced needles to the upper cylinder for a complete revolution and then returning them to the lower cylinder while continuing the feed of elastic thread to needles in the upper cylinder only and fabric thread to all the needles to produce a top portion, discontinuing the feed of elastic thread, and knitting a plurality of courses of fabric thread with selected needles in the upper cylinder and the remainder in the lower cylinder to produce a leg portion.

12. In a method of producing hosiery on a circular knitting machine having coaxial superposed cylinders, the steps of feeding thread to all the needles and manipulating the needles to knit a plurality of ravel courses, positioning alternate needles in the upper cylinder, feeding a fabric thread to all the needles at one feeding station and feeding a draw thread to the needles of one cylinder only at a second feeding station, discontinuing the feeding of draw thread and feeding an elastic thread to the upper cylinder needles only for at least one complete revolution while continuing the feed of fabric thread to all the needles, manipulating the needles to draw loops of fabric thread alternately on opposite sides of the elastic thread, transferring all the needles to the lower cylinder and knitting one or more rounds of plain knit fabric, periodically transferring spaced needles to the upper cylinder for a complete revolution and then returning them to the lower cylinder while continuing the feed of elastic thread to needles in the upper cylinder only and fabric thread to all the needles to produce a top portion, discontinuing the feed of elastic thread, and knitting a plurality of courses of fabric thread while transferring selected needles from one cylinder to the other to produce a leg portion of Links-Links fabric.

13. In a method of producing hosiery on a circular knitting machine having coaxial superposed cylinders, the steps of positioning alternate needles in the upper cylinder, feeding thread to the needles and manipulating the needles to form a selvage, effecting a needle transfer to position recurrent groups of at least two successive needles in one cylinder, feeding thread to the needles and manipulating the needles to form a rib knit top portion, effecting successive needle transfers to position different combinations of needles in the upper and lower cylinders during the knitting of successive courses to produce a leg portion of Links-Links fabric.

14. In a method of producing hosiery on a circular knitting machine having coaxial superposed cylinders, the steps of forming a selvage edge, producing a top portion by effecting successive needle transfers to position different combinations of needles in the upper and lower cylinders during the knitting of successive courses, feeding a fabric thread to needles in both cylinders at one feeding station, feeding an elastic thread to upper cylinder needles only at another feeding station, and manipulating the needles to knit each thread, and thereafter forming a leg portion by continuing the knitting of fabric thread only and transferring needles to produce a different fabric structure from the top.

15. In a circular knitting machine having coaxial superposed needle cylinders, and needles transferable from one cylinder to the other, the combination of selectors associated with the needles and having selector butts disposed at different levels, selector levers movable into operative position to act on selector butts of said selectors to effect transfer of the associated needles from one cylinder to the other, means for moving the selector levers into and out of operative position in a predetermined cycle, and means for independently controlling separate sets of selector levers to maintain one set of levers inoperative while levers of another set are moved into and out of operative position through successive cycles of operation.

16. In a circular knitting machine having coaxial superposed needle cylinders and needles transferable from one cylinder to the other, the combination of selectors associated with the needles and having selector butts disposed at different levels, selector levers movable into operative position to act on selector butts of said selector to effect tranfer of associated needles from one needle cylinder to the other, a pattern drum for moving selector levers into and out of operative position in predetermined cycle, and means for independently controlling separate sets of selector levers to maintain one set of levers inoperative while levers of another set are moved into and out of operative position through successive cycles of operation.

17. In a circular knitting machine having coaxial superposed needle cylinders and needles transferable from one cylinder to the other, the combination of selectors associated with the needles and having selector butts disposed at different levels, selector levers movable into operative position to act on the selector butts of said selectors to transfer the associated needles from one cylinder to the other, means for moving the selector levers into and out of operative position in a predetermined cycle, a bar for blocking one set of selector levers to maintain them in inoperative position, a separate bar for blocking another set of selector levers to maintain them in inoperative position, and means for separately controlling said blocking bars.

18. In a circular knitting machine having a coaxial superposed needle cylinders and needles transferable from one cylinder to the other, the combination of selectors associated with the needles and having selector butts at different levels, selector levers movable into operative position to act on selector butts of said selectors to transfer associated needles from one needle cylinder to the other, a pattern drum for moving the selector levers out of operative position in a predetermined cycle, means for driving the pattern drum, a bar for blocking one set of levers to maintain them in inoperative position, a separate bar for blocking another set of levers to maintain them in inoperative position, and means for separately controlling said blocking bars.

19. In a circular knitting machine having coaxial superposed needle cylinders and needles transferable from one cylinder to the other, the combination of selectors associated with the needles and having selector butts at different levels, selector levers located at corresponding levels and movable into operative position to act on selector butts of the selectors to transfer associated needles from one cylinder to the other, spaced selectors having butts at one level for transferring corresponding spaced needles, and the remaining selectors having butts at a second level for transferring the remaining needles, and at least certain selectors having additional butts at other levels to transfer needles to produce a Links-Links fabric, means for moving the selector levers into and out of operative position in a predetermined cycle, means for independently controlling a set of levers comprising levers acting on selector butts at the above mentioned first and second levels, and means for independently controlling another set of levers comprising levers acting on selector butts at other levels, to maintain one set of levers inoperative, while levers of another set are moved into and out of operative position through successive cycles of operation.

20. In a circular knitting machine having coaxial superposed needle cylinders and needles transferable from one cylinder to the other, the combination of sliders in each cylinder for manipulating the needles, selectors associated with the sliders of the upper cylinder and having selector butts at different levels, selector levers movable into operative position to act on selector butts of said selectors to effect the transfer of associated needles from one cylinder to the other, means for independently controlling separate sets of selector levers to maintain one set inoperative, while levers of another set are moved into and out of operative position in a predetermined cycle, a plurality of feeding stations for feeding thread to the needles, cams acting on butts provided on said sliders to cause needles in both cylinders to take and knit a thread fed at one feeding station, and cams for by-passing upper cylinder needles at a second feeding station to prevent said needles taking a thread fed at said second station.

21. In a circular knitting machine having coaxial superposed needle cylinders and needles transferable from one cylinder to another, the combination of sliders in each cylinder for manipulating the needles, a plurality of feeding stations for feeding thread to the needles, cams acting on butts provided on said sliders to cause the needles in both cylinders to take and knit a thread fed at one feeding station, a cam movable to one position to cause upper cylinder needles to miss a thread fed at a second station and to another position to cause said needles to take said thread, a cam movable to one position to cause lower cylinder needles to miss a thread fed at said second feeding station and to another position to cause said needles to take said thread, and means for moving said cams from one position to another.

22. In a circular knitting machine having coaxial superposed needle cylinders and needles transferable from one cylinder to the other, the combination of sliders in each cylinder to manipulate the needles, a plurality of feeding stations for feeding thread to the needles, cams acting on butts provided on said sliders to cause needles in both cylinders to take and knit a thread fed at one feeding station, cams for causing upper cylinder needles to take and knit a thread fed at a second feeding station, and a cam movable to one position to by-pass lower cylinder needles to prevent their taking a thread fed at said second station and to another position to cause lower cylinder needles to take and knit a thread fed at the second station.

23. In a circular knitting machine having coaxial superposed needle cylinders and needles transferable from one cylinder to the other, the combination of sliders in each cylinder to manipulate the needles, a plurality of feeding stations for feeding thread to the needles, cams acting on butts provided on said sliders to cause the needles in both cylinders to take and knit a thread fed at one feeding station, cams for by-passing lower cylinder needles to prevent their taking thread fed at a second feeding station, and cams for causing upper cylinder needles to take thread fed at said second station and form loops thereof to draw a measured amount of said thread from the thread feed while retaining on said needles the stitches of thread drawn at the first mentioned feeding station.

24. In a circular knitting machine having coaxial superposed needle cylinders, the combination of sliders in each needle cylinder to manipulate the needles, means for positioning spaced needles in the upper cylinder, cams acting on butts provided on said sliders to cause needles in each cylinder to take and knit thread fed at one feeding station, cams for causing upper cylinder needles only to take a thread fed at a second feeding station and form loops thereof to draw a measured amount of said thread from the thread feed while retaining on said needles the stitches of thread drawn at the first mentioned feeding station, and means for transferring said needles to the lower cylinder while retaining both of said threads.

25. In a circular knitting machine having coaxial superposed needle cylinders, the combination of sliders in each needle cylinder to manipulate the needles, means for assembling all of the needles in the lower cylinders, means for transferring spaced needles to the upper cylinder for one revolution, cams acting on butts provided on said sliders to cause needles in both cylinders to take and knit a thread fed at one feeding station, cams for causing upper cylinder needles only to take a thread fed at a second feeding station and form loops thereof to draw a measured amount of said thread from the thread feed while retaining on said needles the stitches of thread drawn at the first mentioned feeding station, and means for retransferring said upper cylinder needles to the lower cylinder while retaining both of said threads.

26. In a circular knitting machine having coaxial superposed needle cylinders, the combination of sliders in each cylinder to manipulate the needles, a plurality of knitting stations, means for feeding thread to the needles at each of said knitting stations, cams acting on butts provided on said sliders to cause needles in both cylinders to knit thread fed at one knitting station, cams for causing upper cylinder needles to knit thread fed at a second knitting station, and selecting means for causing certain lower cylinder needles to knit the thread fed at said second knitting station, and by-passing other lower cylinder needles to prevent their taking said thread.

27. In a circular knitting machine having coaxial superposed needle cylinders, the combination of sliders in each cylinder to manipulate the needles, said sliders having knitting butts and transfer butts, certain sliders of the lower cylinders having long transfer butts and other sliders of the lower cylinder having shorter transfer butts, a plurality of feeding stations for feeding thread to the needles, cams acting on said slider butts to cause needles of both cylinders to knit thread fed at one feeding station, cams for causing upper cylinder needles to knit thread fed at a second feeding station, and a cam movable into position to act on said long transfer butts of the lower cylinder sliders to cause associated lower cylinder needles to take and knit said second thread while by-passing lower cylinder sliders having shorter transfer butts and causing associated lower cylinder needles to miss the thread fed at the second feeding station and retain the stitches of thread drawn at the first feeding station.

28. In a circular knitting machine having coaxial superposed needle cylinders, the combination of sliders in each cylinder to manipulate the needles, said sliders having knitting butts and transfer butts, certain sliders on one side of the lower cylinder having long transfer butts and other sliders on said side of the lower cylinder having short transfer butts, while certain sliders on the opposite side of the lower cylinder have long transfer butts and other sliders on said opposite side of the lower cylinder have medium transfer butts, cams acting on said slider butts to cause needles of both cylinders to knit thread fed at one feeding station, cams for causing upper cylinder needles to knit thread fed at a second feeding station, and a cam movable into a position to act on said long transfer butts of the lower cylinder sliders to cause associated lower cylinder needles to take and knit thread fed at the second feeding station while by-passing lower cylinder sliders having short transfer butts and lower cylinder sliders having medium transfer butts, and causing associated lower cylinder needles to miss thread fed at the second feeding station, and movable to another position to act on long and medium transfer butts to cause all lower cylinder needles on one side of the cylinder to take and knit thread fed at the second feeding station while by-passing short transfer butts, and causing associated lower cylinder needles to miss thread fed at said second feeding station.

29. In a circular knitting machine having coaxial superposed needle cylinders, the combination of sliders in each cylinder to manipulate the needles, means for transferring selected needles from one cylinder to the other in a predetermined cycle to produce a Links-Links fabric, a plurality of feeding stations for feeding thread to the needles, cams acting on butts provided on said sliders to cause needles in both cylinders to knit thread fed at one feeding station, cams for causing said selected needles when in the upper cylinder to knit thread fed at the second feeding station and cams for causing said selected needles when in the lower cylinder to miss thread fed at the second feeding station and retain stitches of thread drawn at the first feeding station.

30. In a circular knitting machine having coaxial superposed needle cylinders, the combination of sliders in each cylinder to manipulate the needles, means for transferring needles from the lower cylinder to the upper cylinder, selectors associated with upper cylinder sliders and having selector butts disposed at different levels, selector levers movable into operative position to act on selector butts of said selectors to effect the transfer of associated needles from the upper cylinder to the lower cylinder, a plurality of feeding stations for feeding thread to the needles, cams acting on butts provided on said sliders to cause needles in both cylinders to knit thread fed at one feeding station, cams for causing said selected needles when in the upper cylinder to knit thread fed at the second feeding station and cams for causing said selected needles when in the lower cylinder to miss thread fed at the second feeding station and retain stitches of thread drawn at the first feeding station.

31. In a circular knitting machine having coaxial superposed needle cylinders, the combination of sliders in each cylinder to manipulate the needles, a plurality of knitting stations, means for feeding thread to the needles at each of said knitting stations, cams acting on butts provided on said sliders to cause upper cylinder needles to receive thread fed at one knitting station and draw stitches thereof, cams for causing lower cylinder needles to receive thread fed at said knitting station and draw stitches of greater length than those drawn by the upper cylinder needles, cams for causing upper cylinder needles to receive and draw stitches of thread fed at a second knitting station, and cams for by-passing at least certain lower cylinder needles to cause said needles to miss thread fed at said second knitting station and retain their stitches of thread drawn at the first knitting station.

32. In a circular knitting machine having coaxial superposed needle cylinders and needles transferable from one cylinder to the other, the combination of sliders in each cylinder to manipulate the needles, selectors associated with the upper cylinder sliders and having selector butts at different levels, selector levers movable into operative position to act on selector butts, to effect the transfer of the associated needles from the upper cylinder to the lower, means for moving certain selector levers into operative position to effect the transfer of selected needles to the lower cylinder to provide a rib fabric, and alternatively moving other selector levers into and out of operative position through a plurality of predetermined cycles to produce Links-Links fabric, while maintaining the first mentioned selector levers in inoperative position to prevent repetition of the rib structure in the Links-Links portion of the fabric.

33. In a circular knitting machine having coaxial superposed needle cylinders and needles transferable from one cylinder to the other, the combination of means for positioning alternate needles in the upper cylinder with intervening needles in the lower cylinder, means for feeding an elastic thread in position to be interlaced alternately in front of and behind successive needles, means for feeding fabric thread in position to be knitted by needles in both cylinders, means for transferring all needles to the lower cylinder for one or more courses, means for periodically positioning spaced needles in the upper cylinder for one revolution, and means for manipulating said needles when in the upper cylinder to take said elastic thread, means for discontinuing the feed of elastic thread after a plurality of spaced elastic-containing courses have been produced, and means for transferring other needles to the upper cylinder to produce a portion of fabric having a different arrangement of inwardly facing stitches and outwardly facing stitches than the elastic containing portion of the fabric.

PAUL L. THURSTON.
DAVID NAGLEY.